United States Patent
Jung

(10) Patent No.: US 11,875,056 B2
(45) Date of Patent: Jan. 16, 2024

(54) CONTROLLER FOR MANAGING COMMANDS WITH ZONE IDENTIFICATIONS AND MEMORY SYSTEM HAVING THE SAME

(71) Applicant: SK hynix Inc., Icheon-si (KR)

(72) Inventor: Jong Tack Jung, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 45 days.

(21) Appl. No.: 17/364,401

(22) Filed: Jun. 30, 2021

(65) Prior Publication Data
US 2022/0229596 A1   Jul. 21, 2022

(30) Foreign Application Priority Data
Jan. 18, 2021   (KR) .................. 10-2021-0006922

(51) Int. Cl.
*G06F 3/06*   (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,626,309 B1* | 4/2017 | Burke | ................... G06F 13/364 |
| 10,417,190 B1 | 9/2019 | Donlan et al. | |
| 11,327,681 B2* | 5/2022 | Shin | ....................... G06F 3/0644 |
| 11,481,146 B2* | 10/2022 | Noh | ....................... G06F 3/0604 |
| 2015/0074337 A1 | 3/2015 | Jo et al. | |
| 2018/0322051 A1* | 11/2018 | Heller | ................. G06F 12/0868 |
| 2021/0056023 A1* | 2/2021 | Jin | ....................... G06F 11/1446 |
| 2021/0081330 A1* | 3/2021 | Bennett | ................. G06F 3/0679 |
| 2021/0255803 A1* | 8/2021 | Kanno | ................. G06F 3/0656 |

(Continued)

FOREIGN PATENT DOCUMENTS

| | | | | |
|---|---|---|---|---|
| JP | 2022-94705 | * | 6/2022 | ............. G06F 12/00 |
| KR | 101154708 B1 | | 6/2012 | |

OTHER PUBLICATIONS

Javier González. "Zoned Namespaces." Feb. 2020. SNIA. https://www.snia.org/sites/default/files/SDCEMEA/2020/3%20-%20Javier%20Gonzalez%20Zoned%20namespacese.PDF. (Year: 2020).*

(Continued)

*Primary Examiner* — Nathan Sadler
(74) *Attorney, Agent, or Firm* — Perkins Coie LLP

(57) ABSTRACT

A controller is provided. The controller includes a write queue configured to store commands for operating a memory device that are generated based on requests received from a host, zone identifications of the commands each indicating a memory region in the memory device to store data corresponding to a command, and write pointers of the commands each indicating an order that the requests are output from the host; and a queue controller configured to receive the commands, the zone identifications, and the write pointers from the write queue, store the commands in buffers allocated the zone identifications based on the write pointers, respectively, and based on an occurrence of an event that a number of commands stored in a buffer among the buffers reaches a preset number set in the buffer, output commands stored in the buffer.

19 Claims, 26 Drawing Sheets

(56) References Cited

U.S. PATENT DOCUMENTS

| | | | |
|---|---|---|---|
| 2021/0263674 A1* | 8/2021 | Shin | G11C 16/26 |
| 2021/0318801 A1* | 10/2021 | Benisty | G06F 3/0644 |
| 2021/0334006 A1* | 10/2021 | Singh | G06F 3/061 |
| 2022/0035561 A1* | 2/2022 | Ha | G06F 3/0619 |
| 2022/0137817 A1* | 5/2022 | Kwak | G06F 3/0659 |
| | | | 711/154 |
| 2022/0156000 A1* | 5/2022 | Inbar | G06F 3/0656 |
| 2022/0188020 A1* | 6/2022 | Ishiguro | G06F 3/0679 |
| 2022/0261180 A1* | 8/2022 | Shin | G06F 3/0614 |
| 2022/0269434 A1* | 8/2022 | Shin | G06F 3/0656 |
| 2022/0308780 A1* | 9/2022 | Kanteti | G06F 3/0647 |

OTHER PUBLICATIONS

Inbar et al. "Data Aggregation in ZNS Drive." U.S. Appl. No. 63/114,397. Nov. 2020. (Year: 2020).*
Brock et al. "Zoned Random Write Area." Aug. 2021. NVM Express. Technical Proposal 4076. (Year: 2021).*
Brock et al. "Zoned Random Write Area." Jan. 2022. NVM Express. Technical Proposal 4076a. (Year: 2022).*
Translation of JP 2022-94705A. Mar. 2022. EPO. (Year: 2022).*

* cited by examiner

FIG. 4A
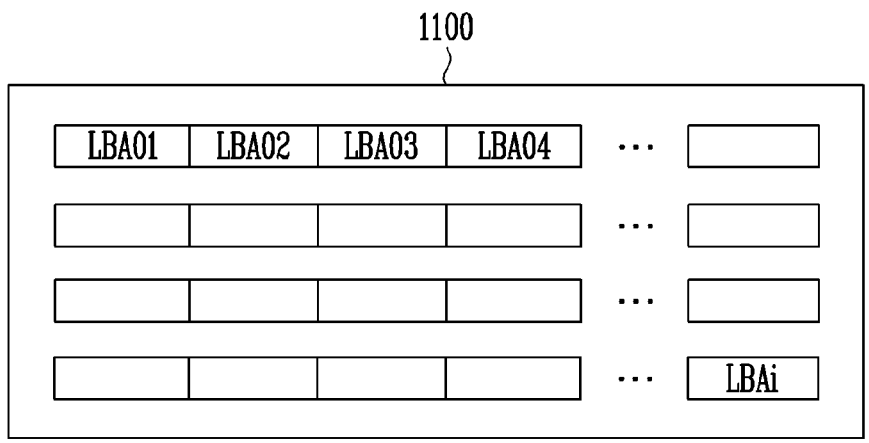
FIG. 4B
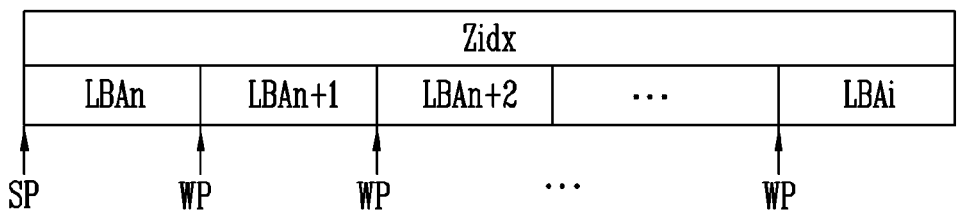
FIG. 4C

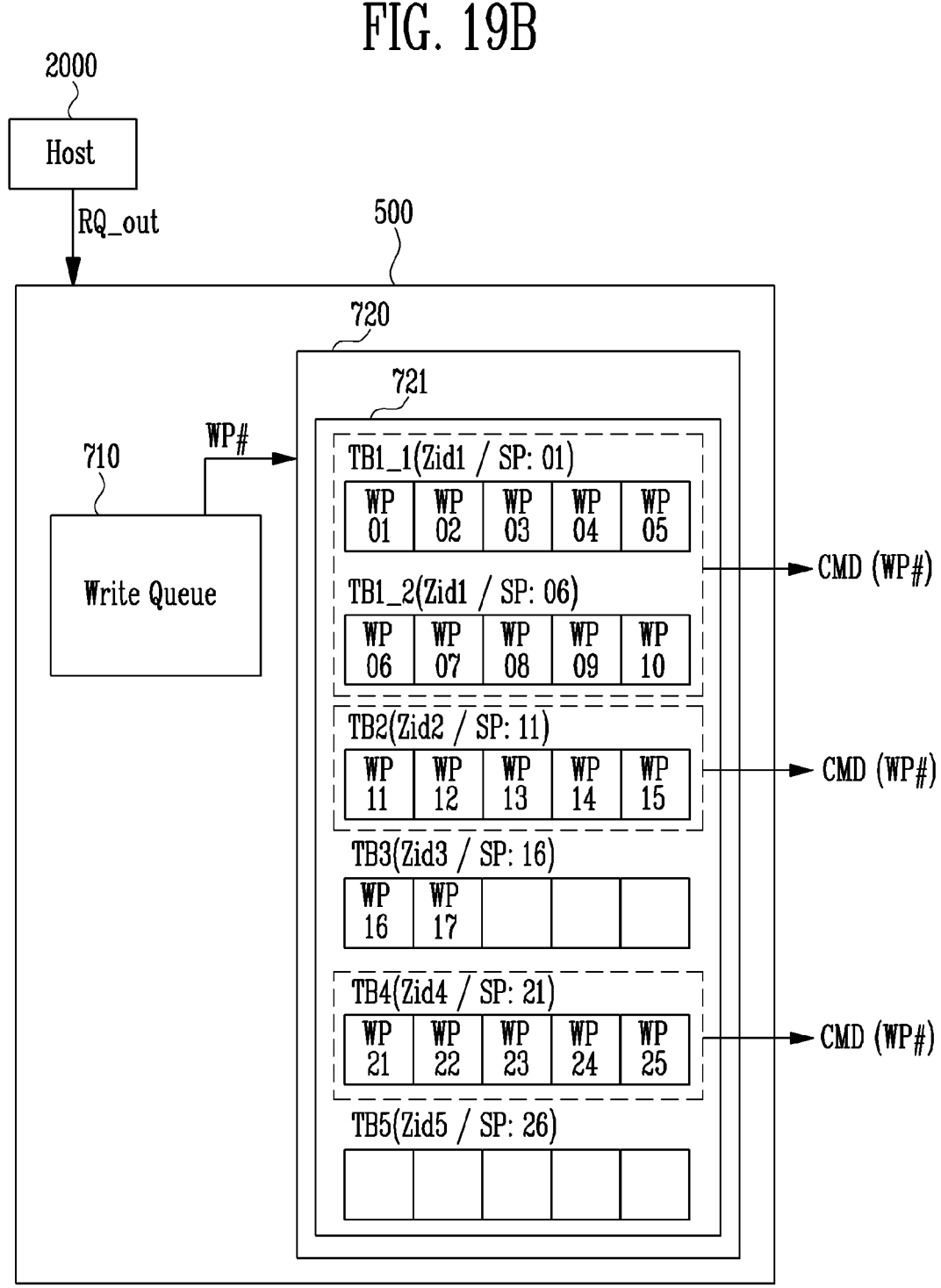

CONTROLLER FOR MANAGING COMMANDS WITH ZONE IDENTIFICATIONS AND MEMORY SYSTEM HAVING THE SAME

CROSS-REFERENCE TO RELATED APPLICATION

This patent document claims priority under 35 U.S.C. § 119(a) to Korean patent application number 10-2021-0006922, filed on Jan. 18, 2021 with the Korean Intellectual Property Office, and the disclosure of which is incorporated herein by reference in its entirety.

TECHNICAL FIELD

Various embodiments of the disclosed technology generally relate to a controller and a memory system having the controller.

BACKGROUND

An electronic system may include a host and a memory system.

The memory system may be configured to store and/or output data in response to a request from a host such as a cellular phone or a computer. The memory system may include a memory device storing data and a controller controlling the memory device. The memory device is generally classified as a volatile memory device or a non-volatile memory device.

A volatile memory device may store data only when power is supplied thereto. Thus, such a volatile memory devices loses its data in the absence of a power supply. Examples of the volatile memory device include a Static Random Access Memory (SRAM) device, a Dynamic Random Access Memory (DRAM) device, or others.

A non-volatile memory device can retain its data even in the absence of power. Examples of the non-volatile memory device include a Read Only Memory (ROM) device, a Programmable ROM (PROM) device, an Electrically Programmable ROM (EPROM) device, an Electrically Erasable and Programmable ROM (EEPROM) device, a flash memory device, or others.

SUMMARY

Various embodiments of the disclosed technology are directed to a controller capable of preventing a phenomenon of a backlog of commands by raising priorities of commands that could be processed in respective zones in a memory system managing a storage device in units of zones and the memory system including the controller.

In one aspect, a controller for controlling a memory device is provided to comprise: a write queue configured to queue commands each including a zone ID and a write pointer in an order in which the commands are input; and a queue controller configured to allocate temporary buffer to the zone IDs of the commands and store the commands output from the write queue in the temporary buffers divided according to the zone IDs, wherein the queue controller is configured to output the commands stored in a temporary buffer of which set storage size is filled up among the temporary buffers.

In another aspect, a controller for controlling a memory device is provided. The controller includes a write queue configured to store commands for operating the memory device that are generated based on requests received from a host, zone identifications of the commands each indicating a memory region in the memory device to store data corresponding to a command, and write pointers of the commands each indicating an order that the requests are output from the host, and a queue controller configured to receive the commands, the zone identifications, and the write pointers from the write queue, store the commands in buffers allocated the zone identifications based on the write pointers, respectively, and based on an occurrence of an event that a number of commands stored in a buffer among the buffers reaches a preset number set in the buffer, output commands stored in the buffer.

In another aspect, a memory system is provided to include a storage device including memory dies storing data; and a controller configured to generate commands in response to requests output from a host and queue the commands depending on states of the dies, wherein the controller is configured to: manage the storage device by dividing the dies according to zone IDs; give a priority to a zone ID filled up with write pointers among the zone IDs regardless of an order of the commands queued during a program operation; and output the commands allocated to the zone ID having the priority.

In another aspect, a memory system is provided to include a storage device including memory dies storing data, and a controller configured to receive requests and write pointers of commands from a host, generate the commands, and store the commands based on operating states of the memory dies, each of the write pointers indicating an order that the requests are output from the host, wherein the controller is configured to manage the storage device by grouping memory blocks in the memory dies to multiple zones, each zone including multiple memory blocks and having a corresponding zone identification, based on whether a number of write pointers allocated a zone identification is greater than a preset number set in the zone identification, assigning a priority to the zone identification, and output commands allocated the zone identification to which the priority is assigned.

In another aspect, a controller is provided to include a command manager configured to generate commands based on requests received from a host, allocate write pointers to the commands in an order in which the commands are generated, and store the commands in order based on an operating state of a storage device, the storage device including memory zones, each memory zone having a corresponding zone identification, a write queue configured to associate each of the commands with a corresponding zone identification and store the commands, temporary buffers configured to store the commands based on the zone identifications associated with the commands, and a zone manager configured to store the commands output from the write queue in the temporary buffers and output corresponding commands included in a temporary buffer whose storage size is filled up.

BRIEF DESCRIPTION OF THE DRAWINGS

FIGS. 4A, 4B, and 4C are diagrams illustrating zones based on an embodiment of the disclosed technology.

FIGS. 19A and 19B are diagrams illustrating operations of a memory system based on a second embodiment of the disclosed technology.

DETAILED DESCRIPTION

Figure 1:
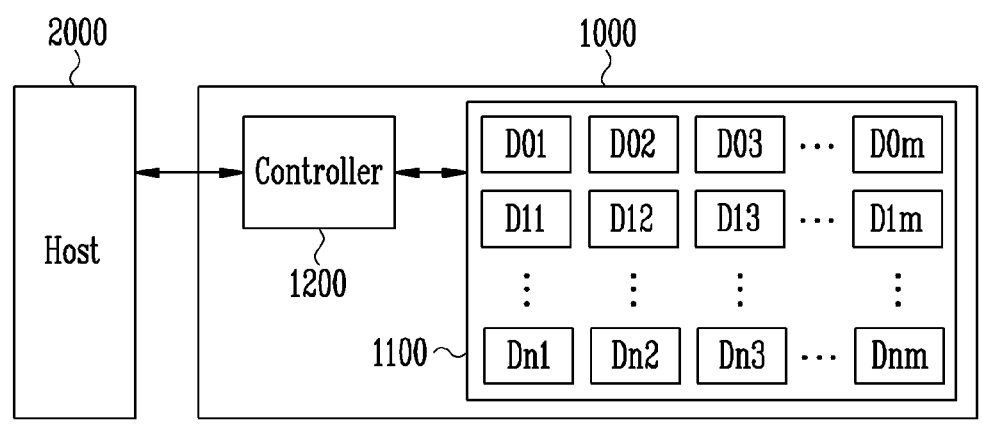
FIG. 1 is a diagram illustrating a memory system based on an embodiment of the disclosed technology.

FIG. 1 is a diagram illustrating a memory system 1000 according to an embodiment of the disclosed technology.

Referring to FIG. 1, the memory system 1000 may include a storage device 1100 storing data and a controller 1200 controlling the storage device 1100.

The storage device 1100 may include a plurality of dies D01 to Dnm. The plurality of dies D01 to Dnm may have the same configuration. The plurality of dies D01 to Dnm may perform a program, read, and/or erase operation in response to a command output from the controller 1200. The plurality of dies D01 to Dnm may be configured as non-volatile memory devices. For example, the non-volatile memory devices may include Electrically Erasable and Programmable ROM (EEPROM), NAND flash memory, NOR flash memory, Phase-change RAM (PRAM), Resistive RAM (ReRAM), Ferroelectric RAM (FRAM), Spin Transfer Torque-Magnetic RAM (STT-MRAM), or others.

The controller 1200 may communicate between a host 2000 and the storage device 1100. For example, the controller 1200 may generate a program, read, and/or erase command in response to a request output from the host 2000 and transfer the generated command to the storage device 1100.

The host 2000 may output a program request, a write pointer, and data to the controller 1200 during the program operation. The write pointer may indicate an order or sequence for outputting the program request by the host 2000 to the controller 1200. For example, the write pointer may have a value which gradually increases every time when the program request is output.

In an embodiment of the disclosed technology, the controller 1200 may manage the plurality of dies D01 to Dnm included in the storage device 1100 in units of zones. For example, the controller 1200 may group memory blocks included in each of the plurality of dies D01 to Dnm based on logical block addresses according to a predetermined storage capacity into multiple zones. A plurality of logical block addresses may be mapped to a single zone. According to an embodiment of the disclosed technology, the controller 1200 may be configured to output one or more commands for a corresponding zone. Accordingly, the controller 1200 may be configured to queue and output the command per zone using the write pointer. For example, the controller 1200 may queue the one or more commands depending on a state of the storage device 1100 regardless of an order of requests received from the host 2000. The controller 1200 may prevent a backlog of commands by queueing the commands per zone using a write pointer.

Figure 2:
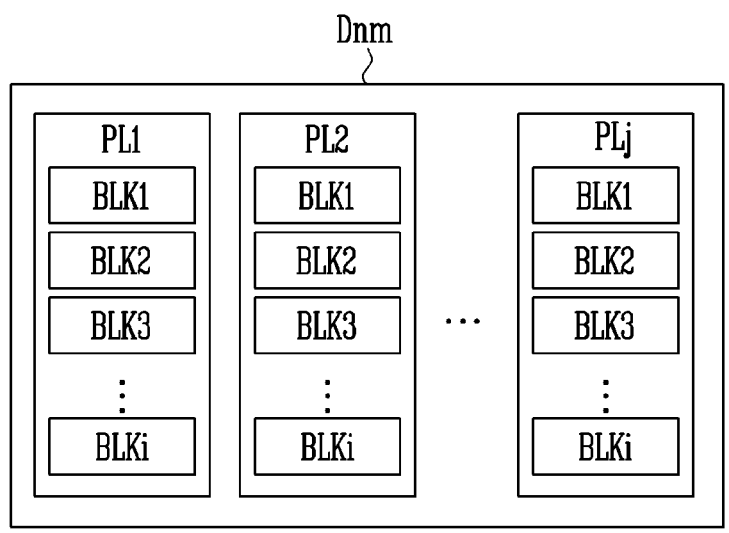
FIG. 2 is a diagram illustrating a die shown in FIG. 1.

FIG. 2 is a diagram illustrating a die shown in FIG. 1. The first to nmth dies D01 to Dnm shown in FIG. 1 may have the same configuration. Thus, the structure of the nmth die Dnm as shown in FIG. 2 can be applied to other dies included in the storage device.

Referring to FIG. 2, the die Dnm may include at least one plane. FIG. 2 illustrates the die Dnm including a plurality of planes PL1 to PLj. The first to jth planes PL1 to PLj may have the same configuration. Each of the first to jth planes PL1 to PLj may include first to ith memory blocks BLK1 to BLKi. Each of the first to ith memory blocks BLK1 to BLKi may include a plurality of memory cells, each memory cell configured to store data. During a program, read, or erase operation, at least one of the first to ith memory blocks BLK1 to BLKi, which are included in each of the first to jth planes PL1 to PLj, may be selected. When the program, read, or erase operation is performed in the die Dnm, a plurality of memory blocks may be selected at the same time. The nmth die Dnm may further include peripheral circuits configured to program, read, or erase the selected memory blocks included in the first to jth planes PL1 to PLj. Because the peripheral circuits may be variously configured depending on a die, a detailed description thereof will be omitted from this embodiment.

Figure 3:
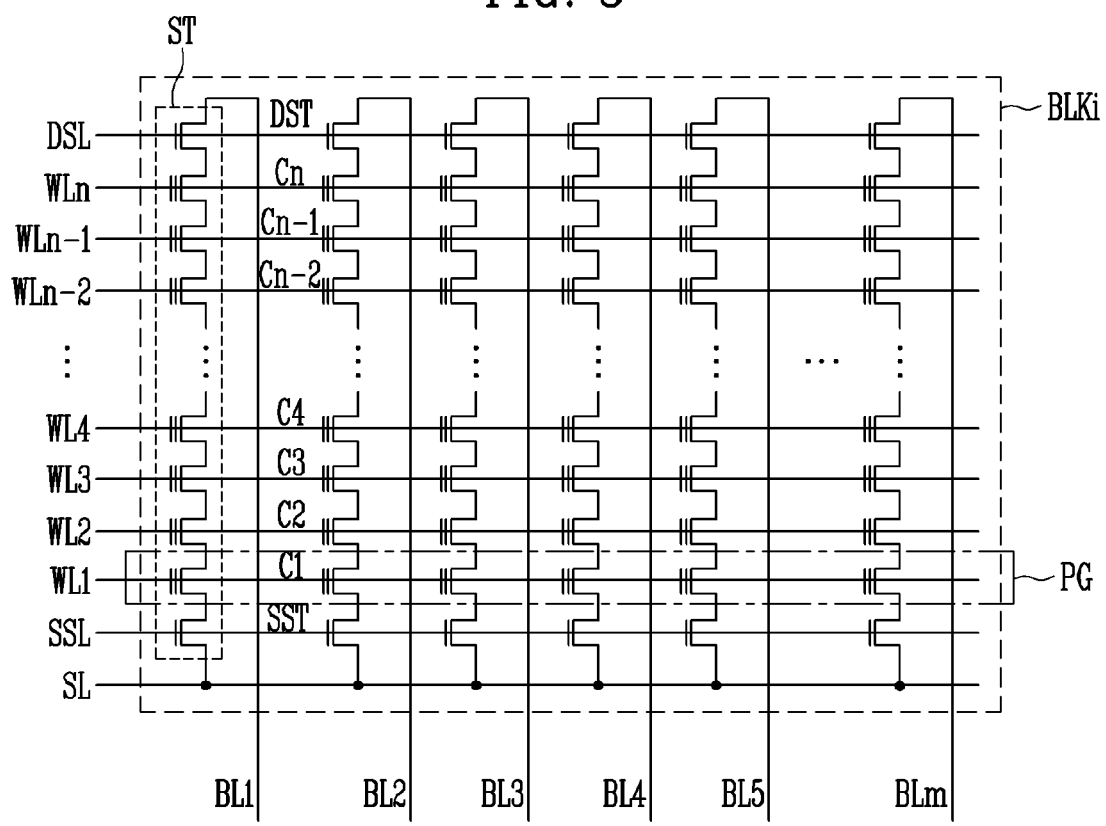
FIG. 3 is a diagram illustrating a memory block shown in FIG. 2.

FIG. 3 is a diagram illustrating a memory block shown in FIG. 2.

Referring to FIG. 3, one memory block BLKi among the plurality of memory blocks BLK1 to BLKi shown in FIG. 2 is illustrated as an embodiment.

The memory block BLKi may include a plurality of strings ST coupled between first to mth bit lines BL1 to BLm and a source line SL, where m is a positive integer. Each of the strings ST may include a source select transistor SST, first to nth memory cells C1 to Cn, and a drain select transistor DST coupled in series between the source line SL and each of the first to mth bit lines BL1 to BLm.

FIG. 3 showing the memory block BLKi is provided to illustrate a configuration of a memory block. Accordingly, numbers of source select transistors SST, first to nth memory cells C1 to Cn, and drain select transistors DST are not limited to the numbers illustrated in FIG. 3.

Gates of the source select transistors SST coupled to the different strings ST may be coupled to a source select line SSL, gates of the first to nth memory cells C1 to Cn may be coupled to first to nth word lines WL1 to WLn, respectively, and gates of the drain select transistors DST may be coupled to a drain select line DSL.

A group of memory cells coupled to the same word line and included in the different strings ST may form one page PG. A program operation and a read operation may be performed in units of the pages PG.

FIGS. 4A, 4B, and 4C are diagrams illustrating zones according to an embodiment of the disclosed technology.

Referring to FIG. 4A, the storage device 1100 may include the plurality of dies D01 to Dnm physically separated from each other. In FIGS. 1 and 2, it has been described that one die includes the memory blocks BLK1 to BLKi that are physically separated from each other. In the embodiment of the disclosed technology as shown in FIGS. 4A to 4C, all memory blocks included in the storage device 1100 may be logically separated from one another. All the memory blocks included in the plurality of dies D01 to Dnm may be separated from one another based on logical block addresses LBA. For example, the logical block addresses LBA may be allocated to all the memory blocks included in the storage device 1100. In the example, first to ith logical block addresses LBA01 to LBAi may be mapped to the memory blocks. In some implementations, the memory blocks to which consecutive logical block addresses are mapped may be disposed to be physically nonconsecutive in the storage device 1100.

Referring to FIG. 4B, the logical block addresses LBA01 to LBAi may be grouped into a plurality of zones and a zone ID Zid may be allocated to each zone. The zone ID Zid may be an index of each zone that is obtained by grouping the memory blocks based on a predetermined storage capacity. The zone ID Zid may indicate a memory region in the memory device to store data corresponding to a command. For example, the logical block addresses LBA01 to LBAi may be grouped into a plurality of zones with the zone IDs from the first zone ID (Zid01) to the xth zone ID (Zidx). Storage capacities of the plurality of zones with the first zone ID (Zid01) to the xth zone ID (Zidx) may be set to be the same or different from each one another. When the storage capacities are set to be the same, the numbers of logical block addresses respectively allocated to the plurality of zones with the first zone ID (Zid01) to the xth zone ID (Zidx) may be the same. When the storage capacities are set to be different from one another, the numbers of logical block addresses respectively allocated to the plurality of zones with the first zone ID (Zid01) to the xth zone ID (Zidx) may be different. In some implementations, some of the plurality of zones with the first zone ID (Zid01) to xth zone ID (Zidx) have a same storage capacities the remaining of the plurality of zones with the first zone ID (Zid01) to the xth zone ID (Zidx) have different storage capacities.

FIG. 4C illustrates an example of a zone with xth zone ID (Zidx) among the plurality of zones with the first zone ID (Zid01) to the xth zone ID (Zidx). It is assumed that the nth to ith logical block addresses LBAn to LBAi are allocated to the zone with the xth zone ID (Zidx). A write pointer WP received from a host may indicate a logical block address selected when consecutive pieces of data are stored and a start pointer SP may be the first logical block address of the xth zone ID (Zidx). For example, a write pointer may indicate an order of requests that the host transfers to the controller. Referring to FIG. 4C, each of logical block addresses LBAn, LBAn+1, LBAn+2, . . . , LBAi may be the write pointer WP and the logical block address LBAn, that is, the first write pointer among the logical block addresses LBAn, LBAn+1, LBAn+2, . . . , LBAi may be the start pointer SP. Accordingly, different logical block addresses may be designated as start pointers for different zones with different zone IDs.

Figure 5:
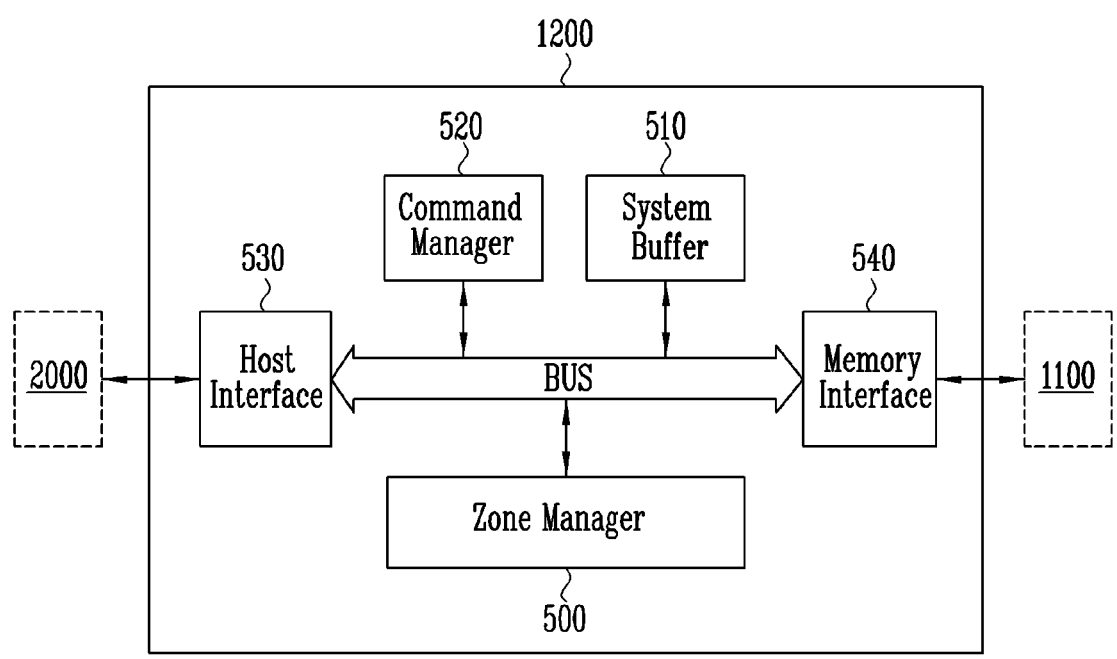
FIG. 5 is a diagram illustrating a controller based on an embodiment of the disclosed technology.

FIG. 5 is a diagram illustrating a controller according to an embodiment of the disclosed technology.

Referring to FIG. 5, the controller 1200 may include a zone manager 500, a system buffer 510, a command manager 520, a host interface 530, and a memory interface 540. The zone manager 500, the system buffer 510, the command manager 520, the host interface 530, and the memory interface 540 may be communicated with each other through a bus BUS.

When write pointers corresponding to commands are nonconsecutive during a program operation, the zone manager 500 may adjust an order of queueing the commands such that the write pointers are consecutive in the same zone ID. In some implementations, when there is a zone with a zone ID in which write pointers are filled up, the zone manager 500 may put a higher output priority of a command corresponding to the zone ID. For example, the zone manager 500 may output the command corresponding to the zone ID filled up with write pointers earlier than a command corresponding to a zone ID which is not filled up with write pointers.

The system buffer 510 may be configured to store various types of information for operations of the controller 1200. For example, the system buffer 510 may store mapping information of a logical block address and a physical block address. For example, the system buffer 510 may store a map table including logical block addresses corresponding to write pointers and physical block addresses mapped to the logical block addresses. A physical block address may be allocated to each of dies and memory blocks that can be managed in a storage device, and a logical block address may be managed in a host. Accordingly, nonconsecutive physical block addresses may be mapped to consecutive logical block addresses.

When the command manager 520 receives a request from the host 2000, the command manager 520 may generate a command corresponding to the request and change an order of commands depending on a state of the storage device 1100. The commands may be queued regardless of an order of write pointers. The queued commands may be transferred to the zone manager 500.

The host interface 530 may be configured to exchange a request, an address, or data between the host 2000 and the controller 1200.

The memory interface 540 may be configured to exchange a command, an address, or data between the controller 1200 and the storage device 1100. The memory interface 540 may include buffers capable of temporarily storing commands output from the zone manager 500 before outputting the commands to the storage device 1100. The memory interface 540 may receive physical block addresses, which respectively correspond to write pointers output from the zone manager 500, from the system buffer 510 and output the commands and the physical block addresses to the storage device 1100.

Figure 6:
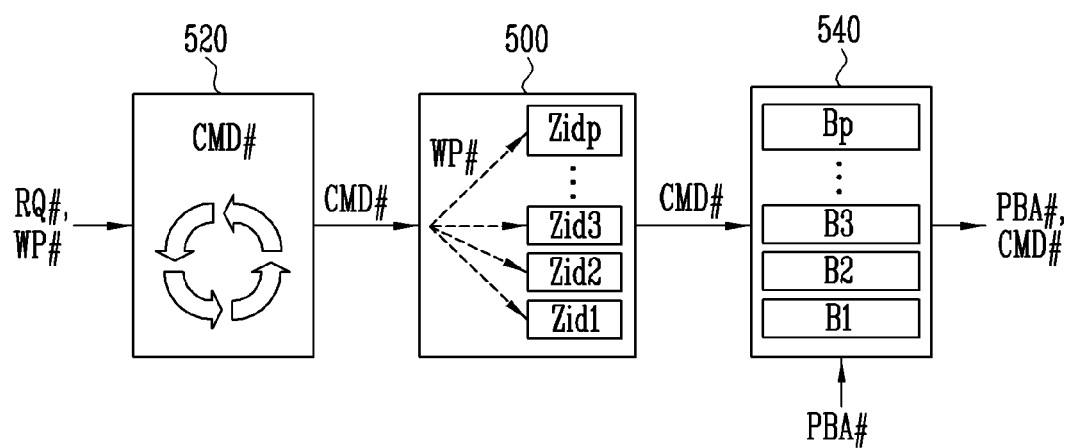
FIG. 6 is a diagram illustrating an operation of a controller based on an embodiment of the disclosed technology.

FIG. 6 is a diagram illustrating an operation of the controller 1200 according to an embodiment of the disclosed technology.

Referring to FIG. 6, when the command manager 520 receives requests RQ #and write pointers WP #output from a host, the command manager 520 may generate commands CMD #for executing the requests RQ #and adjust an order of executing the commands CMD #depending on operation states of dies in which the commands CMD #are executed. The command manager 520 may queue (or store) the commands CMD #according to the operation states of the dies included in a storage device regardless of an order of the write pointers WP #. For example, the command manager 520 may check idle dies and dies in operation and change an order of executing commands such that a priority of commands that can be executed in the idle dies is higher than a priority of commands executed in the dies in operation. In addition, the command manager 520 may change an order of executing commands in various manners.

The zone manager 500 may temporarily store the commands CMD #output from the command manager 520 and adjust the order of the commands CMD #again depending on the zone IDs Zid and the write pointers WP #. When a zone ID Zid filled up with the commands CMD #corresponding to a set write size occurs, the zone manager 500 may transfer the commands CMD #of the corresponding zone ID Zid to the memory interface 540. The commands CMD #may be program commands.

The memory interface 540 may include a plurality of output buffers B1 to Bp for storing commands CMD, which are output from the zone manager 500, per zone ID Zid #. For example, the output buffers B1 to Bp may correspond to the zone IDs Zid #in a one-to-one manner. The memory interface 540 may output physical block addresses PBA #and the commands CMD #corresponding to the write pointers WP #to a die corresponding to the zone ID Zid #.

Figure 7:
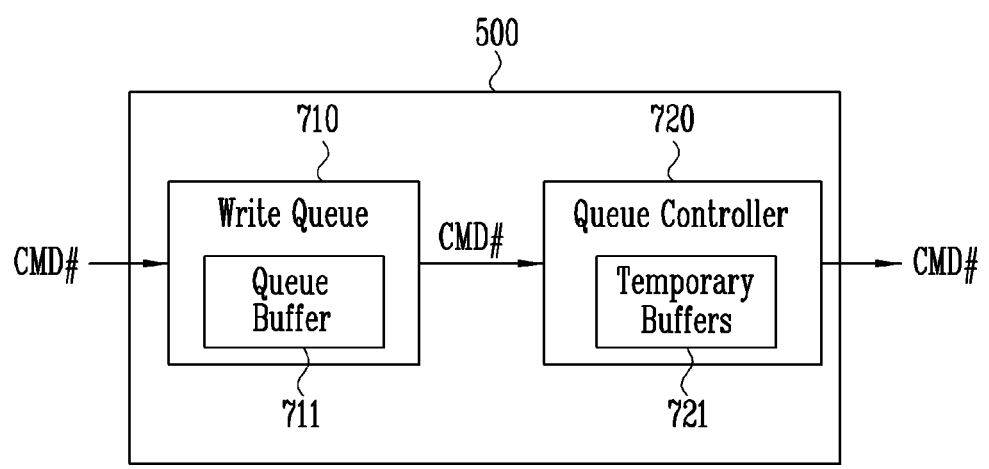
FIG. 7 is a diagram illustrating a zone manager based on an embodiment of the disclosed technology.

FIG. 7 is a diagram illustrating the zone manager 500 according to an embodiment of the disclosed technology.

Referring to FIG. 7, the zone manager 500 may include a write queue 710 and a queue controller 720.

The write queue 710 may include a queue buffer 711 temporarily storing the commands CMD #output from the command manager 520 of FIG. 6, and a zone ID and a write pointer that correspond to each of the commands CMD #. Orders of zone IDs and write pointers of the commands CMD #input to the queue buffer 711 may be nonconsecutive.

The queue controller 720 may receive the commands CMD #, the zone IDs, and the write pointers from the write queue 710. The queue controller 720 may include temporary buffers 721 storing the commands CMD #output from the write queue 710 per zone ID and per write pointer. The queue controller 720 may sequentially store the commands CMD #in the temporary buffers 721 depending on the zone ID and the write pointer. In other words, the queue controller 720 may store the commands CMD # in the temporary buffers 721 allocated the zone identifications based on the write pointers, respectively. When a temporary buffer of which set size is filled up occurs, the queue controller 720 may output the commands CMD #stored in the corresponding temporary buffer. In other words, based on an occurrence of an event that a number of commands CMD #stored in a temporary buffer among the temporary buffers 721 reaches a preset number set in the temporary buffer, the queue controller 720 may output commands stored in the temporary buffer.

Figure 8:
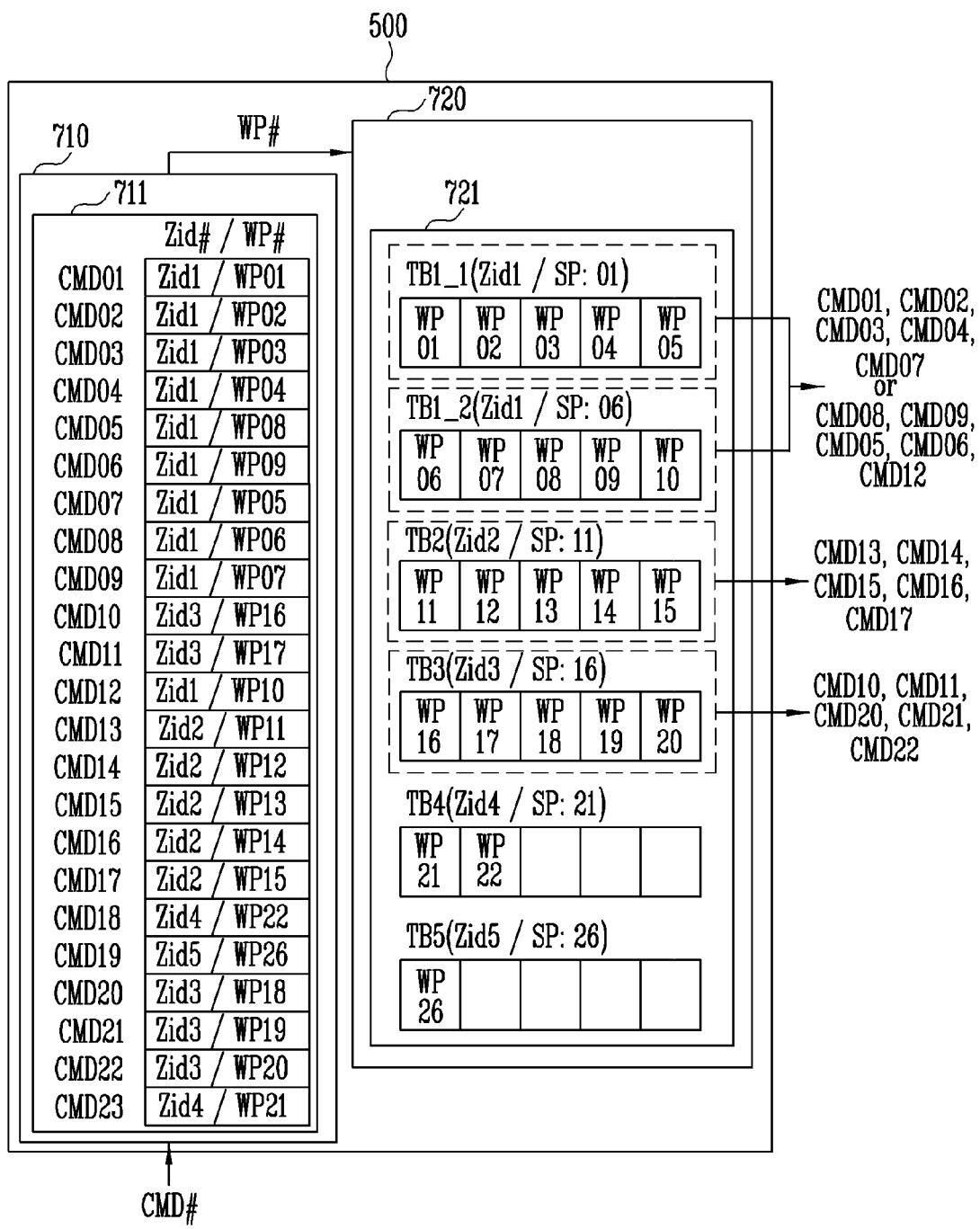
FIG. 8 is a diagram illustrating an operation of a zone manager based on an embodiment of the disclosed technology.

FIG. 8 is a diagram illustrating an operation of the zone manager 500 based on an embodiment of the disclosed technology.

Referring to FIG. 8, when the commands CMD #are input to the zone manager 500, the zone manager 500 may store the commands CMD #, and the zone IDs Zid #and the write pointers WP #that correspond to the commands CMD #in the queue buffer 711 according to an order in which the commands are input. For example, it is assumed that memory blocks included in a storage device are logically divided into five regions, such that five zone IDs are set and at least one of the write pointers is allocated to each of the five zone IDs. In this example, first to fifth zone IDs Zid1 to Zid5 and different write pointers WP #may be allocated to the first to fifth zones with the zone IDs Zid1 to Zid5.

In FIG. 8, figures of commands in the queue buffer 711 may indicate an order in which the commands are input to the queue buffer 711. For example, a first command CMD01 may indicate a command input first to the queue buffer 711.

The first zone ID Zid1 and a first write pointer WP01 may be allocated to the first command CMD01. The first to twenty-third commands CMD01 to CMD23 may be sequentially input to the queue buffer 711 in the above-described manner. Write pointers respectively allocated to the first to twenty-third commands CMD01 to CMD23 are nonconsecutive regardless of the order in which the commands are input from the host. The nonconsecutive write pointers may mean that an order of commands requested from the host has been changed. For example, because the first to fourth write pointers WP01 to WP04 are respectively allocated to the first to fourth commands CMD01 to CMD04, an order of the first to fourth commands CMD01 to CMD04 is the same as the order according to the request from the host. However, because the eighth write pointer WP08 is allocated to the fifth command CMD05 input next to the fourth command CMD04, the fifth command CMD05 and the fourth command CMD04 are nonconsecutive, which means that the order of the fifth command CMD05 has been changed after receiving the corresponding the request from the host.

The queue controller 720 may store the commands CMD #output from the write queue 710 in temporary buffers TB1 to TB5 that are configured based on the zone IDs Zid #. For example, each of the first to fifth temporary buffers TB1 to TB5 may include sub-buffers respectively storing the commands CMD # of the set number. For example, when a greater storage capacity is allocated to the first temporary buffer TB1 than each of the second to fifth temporary buffers TB2 to TB5, the first temporary buffer TB1 may include a 1_1 temporary buffer TB1_1 and a 1_2 temporary buffer TB1_2. The 1_1 and 1_2 temporary buffers TB1_1 and TB1_2 may be allocated to the first zone ID Zid1 and the second to fifth temporary buffers TB2 to TB5 may be allocated to the second to fifth zone IDs Zid2 to Zid5, respectively. The queue controller 720 may select a temporary buffer based on the zone ID Zid #of the command CMD #stored in the queue buffer 711, select one sub-buffer based on the write pointer WP #of the command CMD #among sub-buffers included in the selected temporary buffer, and then store the command CMD #in the selected sub-buffer.

For example, when the start pointer SP of the 1_1 temporary buffer TB1_1 is set to 01 and the start pointer SP of the 1_2 temporary buffer TB1_2 is set to 06, the first, second, third, fourth, and seventh commands CMD01, CMD02, CMD03, CMD04, and CMD07 to which the first to fifth write pointers WP01 to WP05 are respectively allocated may be stored in the 1_1 temporary buffer TB1_1 and the eighth, ninth, fifth, sixth, and twelfth commands CMD08, CMD09, CMD05, CMD06, and CMD12 to which the sixth to tenth write pointers WP06 to WP10 are respectively allocated may be stored in the 1_2 temporary buffer TB1_2. Because the first write pointer WP01 designated the start pointer (SP) 01 is allocated to the first sub-buffer of the 1_1 temporary buffer TB1_1, the first command CMD01, to which the first write pointer WP01 is allocated, is stored in the first sub-buffer and the eighth command CMD08, to which the sixth write pointer WP06 designated the start pointer (SP) 06 is allocated, is stored in the first sub-buffer of the 1_2 temporary buffer TB1_2.

For example, because the third zone ID Zid3 and the sixteenth write pointer WP16 are allocated to the tenth command CMD10 when the tenth command CMD10 stored in the queue buffer 711 is output from the write queue 710, the third temporary buffer TB3 to which the third zone ID Zid3 is allocated may be selected among the first to fifth temporary buffers TB1 to TB5. Because the start pointer SP of the third temporary buffer TB3 is 16, the tenth command CMD10 to which the sixteenth write pointer WP16 is allocated may be stored in a sub-buffer corresponding to the start pointer (SP) 16.

According to the above-described manner, the first to twenty-third commands CMD01 to CMD23 temporarily stored in the queue buffer 711 may be stored in the temporary buffers 721 depending on a zone ID and a write pointer.

When all sub-buffers of a temporary buffer is filled up with commands, the queue controller 720 may output commands stored in the corresponding temporary buffer. For example, when all the first, second, third, fourth, and seventh commands CMD01, CMD02, CMD03, CMD04, and CMD07, to which the first to fifth write pointers WP01 to WP05 are respectively allocated, are respectively stored in all sub-buffers included in the 1_1 temporary buffer TB1_1, the queue controller 720 may output the first, second, third, fourth, and seventh commands CMD01, CMD02, CMD03, CMD04, and CMD07 stored in the 1_1 temporary buffer TB1_1. The first, second, third, fourth, and seventh commands CMD01, CMD02, CMD03, CMD04, and CMD07 may be rearranged according to the first to fifth write pointers WP01 to WP05. The rearranged order may be different from the order that the host requested. When all the eighth, ninth, fifth, sixth, and twelfth commands CMD08, CMD09, CMD05, CMD06, and CMD12, to which the sixth to tenth write pointers WP06 to WP10 are respectively allocated, are respectively stored in all sub-buffers included in the 1_2 temporary buffer TB1_2, the queue controller 720 may output the eighth, ninth, fifth, sixth, and twelfth commands CMD08, CMD09, CMD05, CMD06, and CMD12 stored in the 1_2 temporary buffer TB1_2. According to the above-described manner, when all the commands CMD #are stored in the second and third temporary buffers TB2 and TB3, the queue controller 720 may output commands of a temporary buffer, which is filled up with all the commands CMD #, earlier than another temporary buffer.

When the fourth and fifth temporary buffers TB4 and TB5 are not filled up with the commands CMD #, the queue controller 720 may hold output of the commands CMD #stored in the fourth and fifth temporary buffers TB4 and TB5 until the fourth and fifth temporary buffers TB4 and TB5 are filled up with the commands CMD #. For example, when the twenty-first to twenty-fifth write pointers WL21 to WP25 are allocated to the fourth temporary buffer TB4, and only the twenty-third and eighteenth commands CMD23 and CMD18 respectively corresponding to the twenty-first and twenty-second write pointers WP21 and WP22 are stored in the fourth temporary buffer TB4, because the commands CMD #, to which the remaining write pointers, that is, the twenty-third to twenty-fifth write pointers WP23 to WP25 are allocated, are not stored, consecutive pieces of data might not be programmed into memory regions mapped to the fourth zone ID Zid4. Accordingly, the queue controller 720 may delay output of commands until the fourth temporary buffer TB4 is filled up with the commands.

When the fifth temporary buffer TB5 is filled up with all commands before the fourth temporary buffer TB4, the queue controller 720 may output the commands stored in the fifth temporary buffer TB5 before the commands stored in the fourth temporary buffer TB4.

Figure 9:
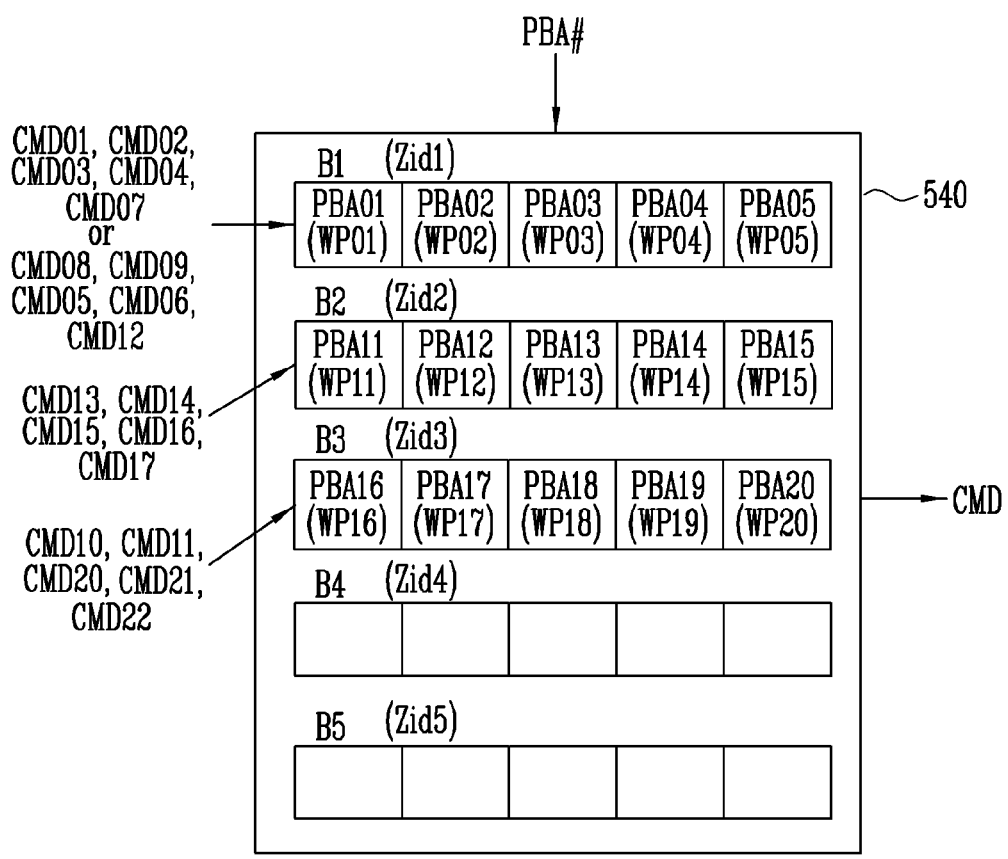
FIG. 9 is a diagram illustrating a memory interface based on an embodiment of the disclosed technology.

FIG. 9 is a diagram illustrating a memory interface 540 based on an embodiment of the disclosed technology.

Referring to FIGS. 8 and 9, the memory interface 540 may include the first to fifth output buffers B1 to B5 that are configured to correspond to the first to fifth zone IDs Zid1 to Zid5. The first output buffer B1 may store first to fifth physical block addresses PBA01 to PBA05 mapped to the first to fifth write pointers WP01 to WP05, respectively. The first to fifth physical block addresses PBA01 to PBA05 may be information that is searched in the system buffer 510 shown in FIG. 5 by the command manager 520 shown in FIG. 5.

When the first zone ID Zid1 is allocated to the first output buffer B1 in the memory interface 540, the physical block addresses PBA #of the write pointers WP01 to WP05 or WP06 to WP10 that are allocated to the commands CMD output from the 1_1 temporary buffer TB1_1 or the 1_2 temporary buffer TB1_2 may be temporarily stored and then output. The memory interface 540 may store the first to fifth physical block addresses PBA01 to PBA05 mapped to the first to fifth write pointers WP01 to WP05, respectively, and then transfer the command CMD to dies included in a storage device according to the first zone ID Zid1 and the first to fifth physical block addresses PBA01 to PBA05.

When commands are stored in temporary buffers in which some of commands are not stored, such as the fourth and fifth temporary buffers TB4 and TB5 as shown in FIG. 8, these commands are not output. Accordingly, even when a command to which the twenty-first, twenty-second, or the twenty-sixth write pointer WP21, WP22, or WP26 is allocated is stored in the fourth and fifth temporary buffers TB4 and TB5, the physical block addresses PBA #might not be stored in the fourth output buffer B4 corresponding to the fourth temporary buffer TB4 and the fifth output buffer B5 corresponding to the fifth temporary buffer TB5.

Figure 10:
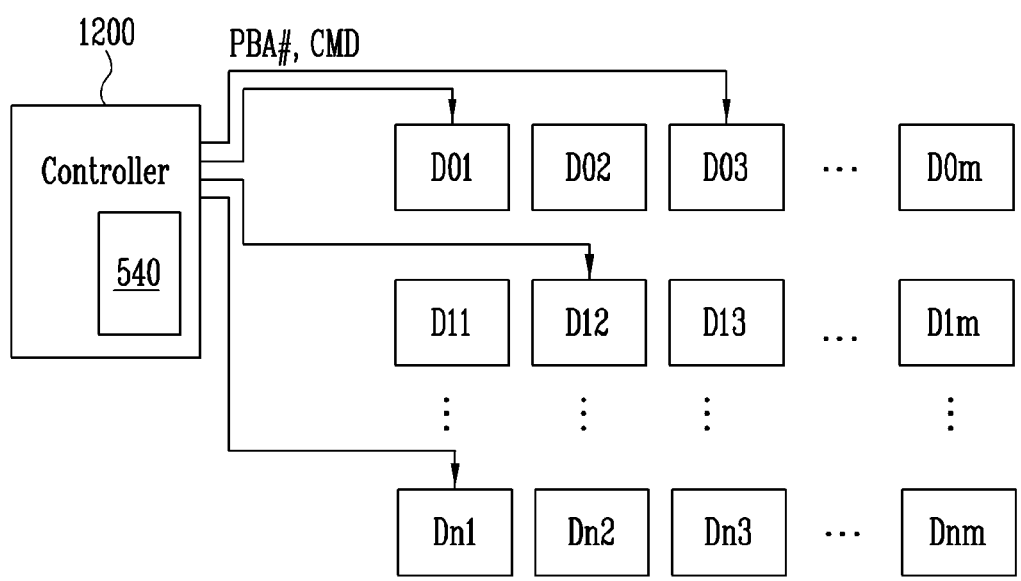
FIG. 10 is a diagram illustrating an operation of a controller to access dies.

FIG. 10 is a diagram illustrating an operation of the controller 1200 to access dies.

Referring to FIG. 10, the controller 1200 may transfer the physical block addresses PBA #and the commands CMD to dies selected based on the physical block addresses PBA #stored in the memory interface 540 and according to the zone IDs Zid #corresponding to the physical block addresses PBA #.

A method in which the zone manager rearranges an order of outputting the commands is described in detail below based on the descriptions above.

FIGS. 11 to 18B are diagrams sequentially illustrating operations of a memory system according to a first embodiment of the disclosed technology.

Figure 11:
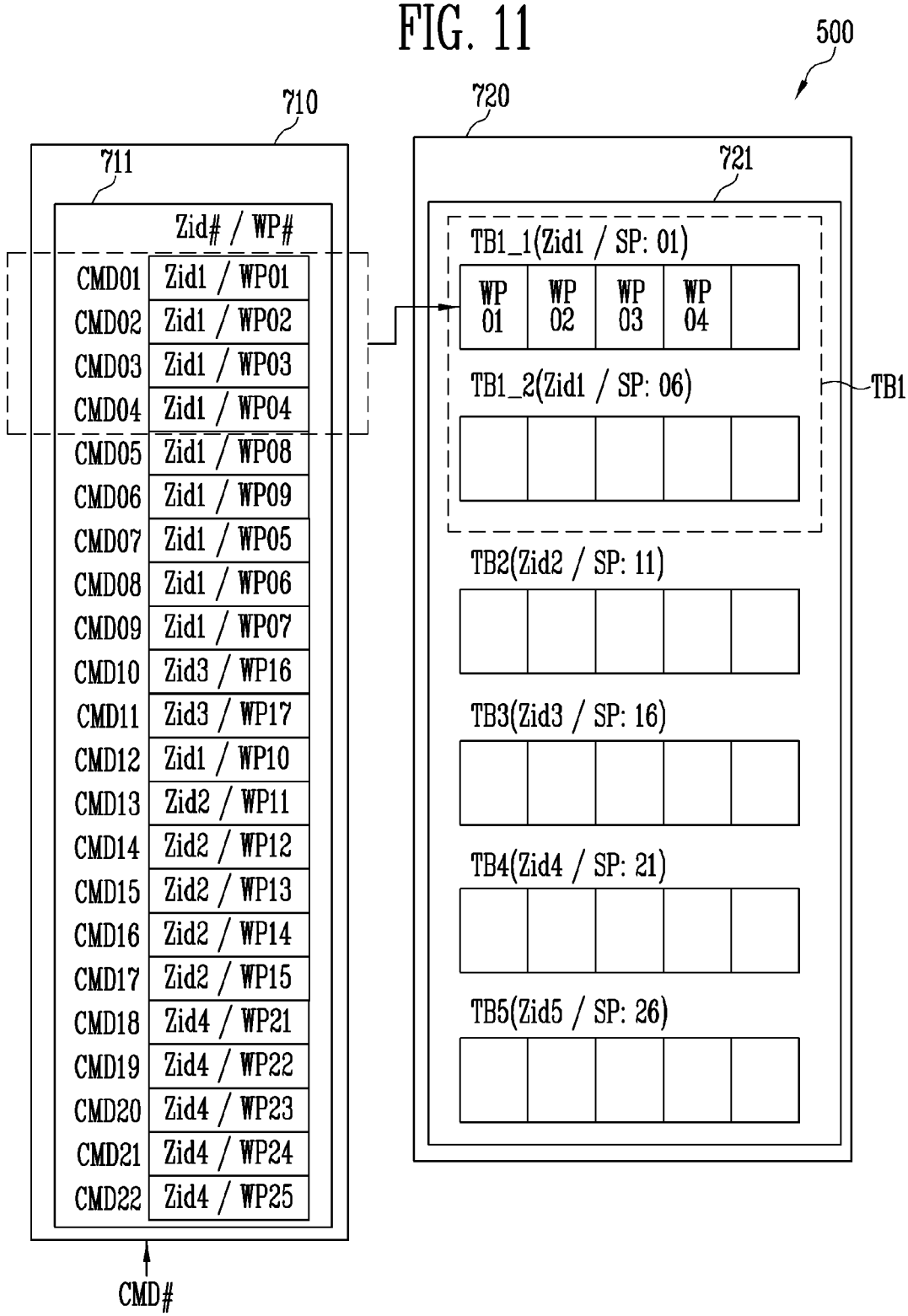
FIGS. 11 to 18B are diagrams sequentially illustrating operations of a memory system based on a first embodiment of the disclosed technology.

Referring to FIG. 11, when the commands CMD #are input to the write queue 710, the write queue 710 may store the commands CMD #, and the zone IDs Zid1 to Zid5 and the write pointers WP01 to WP25 allocated to the commands CMD #in the queue buffer 711 in an order in which the commands are input. In the first embodiment, a case where the first to twenty-second commands CMD01 to CMD22 are input is described as an example. However, when an empty region exists in the queue buffer 711, the commands CMD #may be further input. All the first to twenty-second commands CMD01 to CMD22 may be program commands, and the figures '01 to 22' of the commands CMD #mean the order in which the commands CMD #are input.

Because the first zone ID Zid1 is allocated and the first to fourth write pointers WP01 to WP04 are respectively allocated to the first to fourth commands CMD01 to CMD04, the first temporary buffer TB1 corresponding to the first zone ID Zid1 may be selected among the temporary buffers 721. The first temporary buffer TB1 may include the 1_1 and 1_2 temporary buffers TB1_1 and TB1_2. Because the start pointer SP of the 1_1 temporary buffer TB1_1 is 01, the first command CMD01 to which the first write pointer WP01 is allocated may be input to the first sub-buffer of the 1_1 temporary buffer TB1_1 and the second, third, and fourth commands CMD02, CMD03, and CMD04 to which the second, third, and fourth write pointers WP02, WP03, and WP04, are respectively allocated, may be sequentially input to the remaining sub-buffers other than the first sub-buffer.

Figure 12:
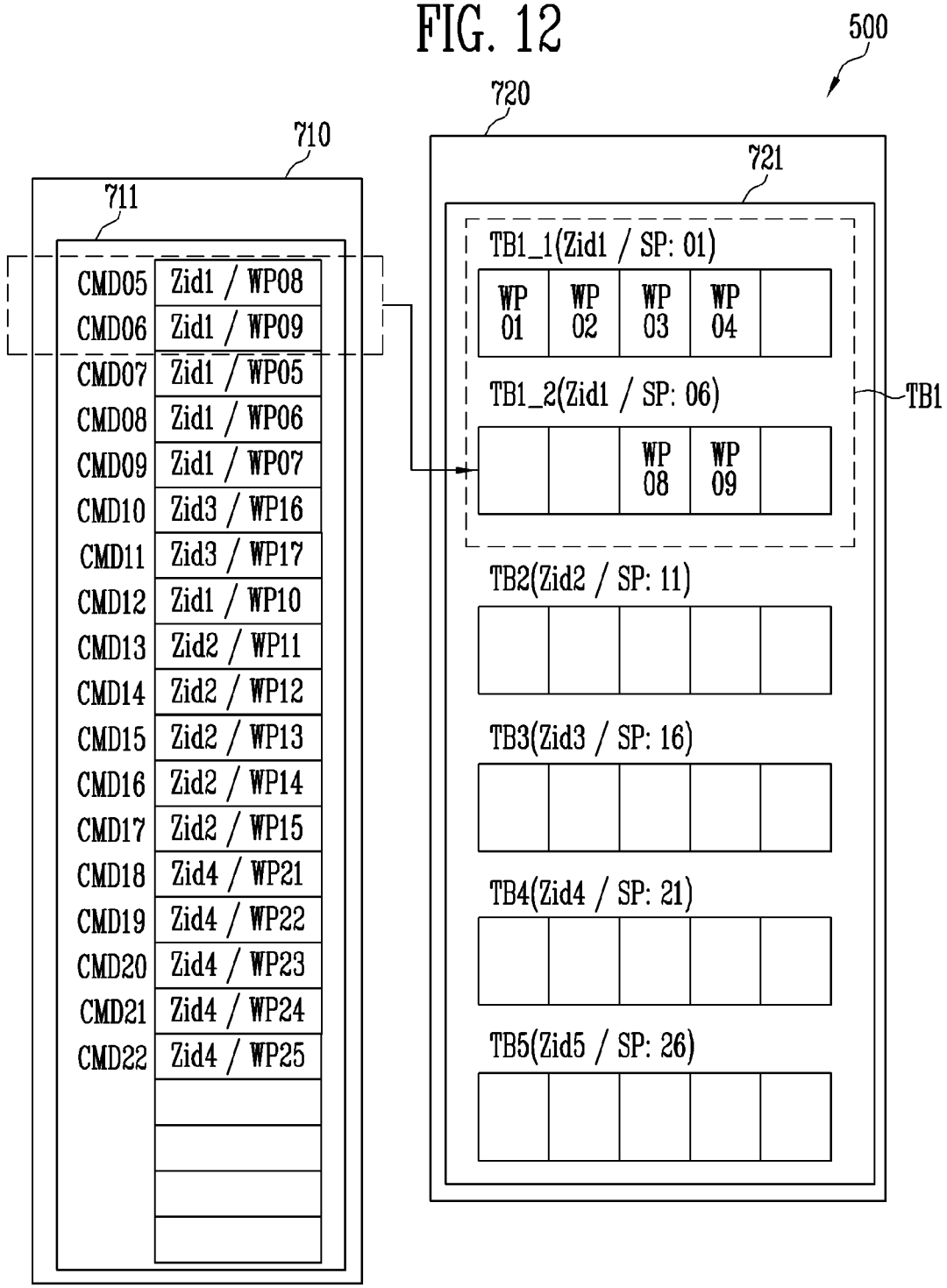

Referring to FIG. 12, the first zone ID Zid1 is allocated to the fifth command CMD05 input next to the fourth command CMD04. However, because a write pointer allocated to the fifth command CMD05 is not the fifth write pointer WP05 but the eighth write pointer WP08, the order of write pointers is nonconsecutive. Accordingly, the queue controller 720 may input the fifth command CMD05 to which the eighth write pointer WP08 is allocated to the third sub-buffer of the 1_2 temporary buffer TB1_2 of which start pointer SP is 06. Because the sixth command CMD06, to which the ninth write pointer WP09 of the first zone ID Zid1 next to the eighth write pointer WP08 is allocated, is input, the sixth command CMD06 to which the ninth write pointer WP09 is allocated may be input to the fourth sub-buffer of the 1_2 temporary buffer TB1_2.

Figure 13A:
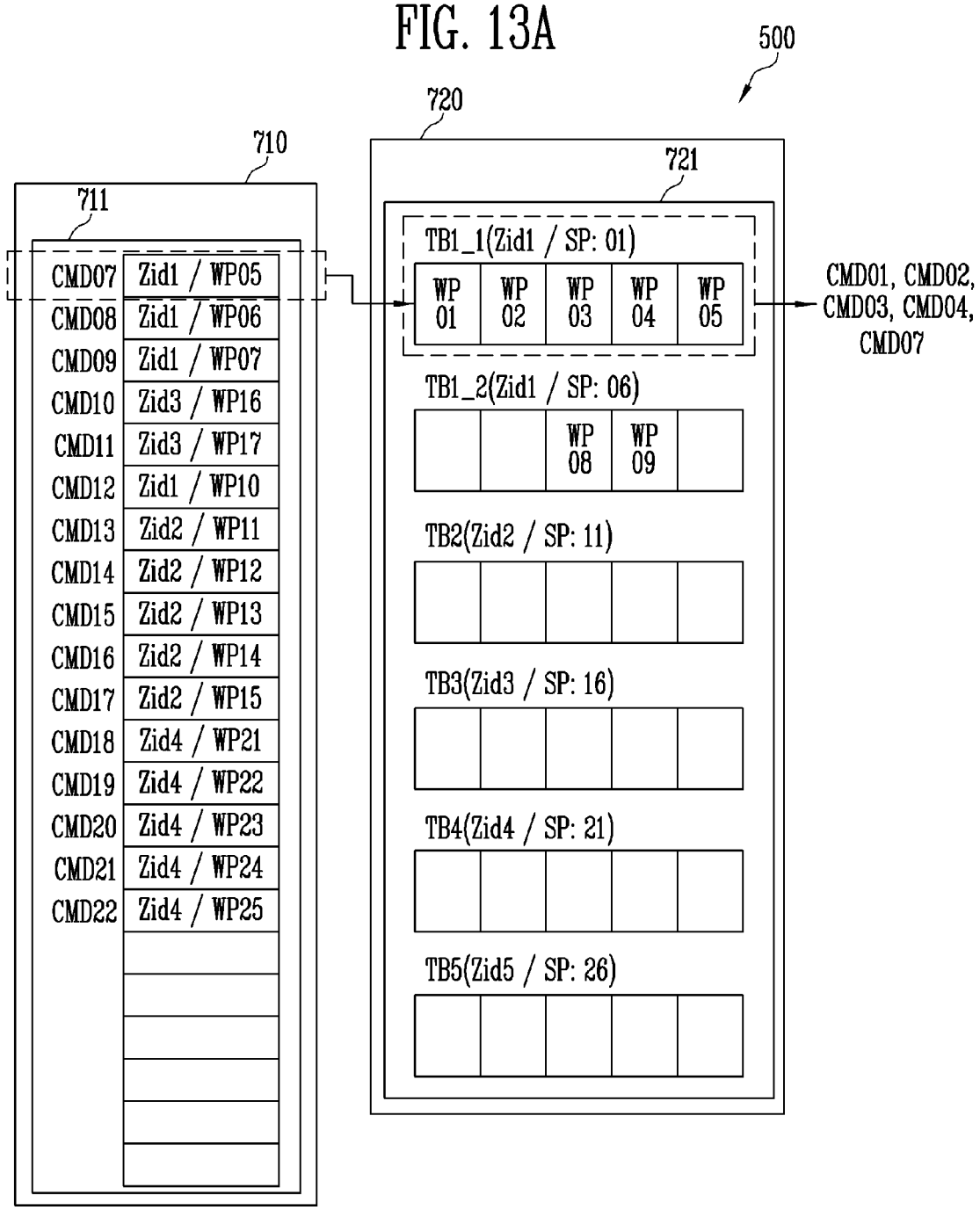

Referring to FIG. 13A, because the fifth write pointer WP05 of the first zone ID Zid1 is allocated to the seventh command CMD07 input next to the sixth command CMD06, the order of write pointers is nonconsecutive. Accordingly, the queue controller 720 may input the seventh command CMD07 to which the fifth write pointer WP05 is allocated to the fifth sub-buffer in the 1_1 temporary buffer TB1_1. Accordingly, all sub-buffers of the 1_1 temporary buffer TB1_1 may be filled with the first, second, third, fourth, and seventh commands CMD01, CMD02, CMD03, CMD04, and CMD07, to which the first, second, third, fourth, and fifth write pointers WP01, WP02, WP03, WP04, and WP05 are respectively allocated, in a one-to-one manner. Because all the five sub-buffers which constitute a storage size capable of programming consecutive pieces of data are filled up, the queue controller 720 may output the first, second, third, fourth, and seventh commands CMD01, CMD02, CMD03, CMD04, and CMD07 to which the first zone ID Zid1 is allocated and the first, second, third, fourth, and fifth write pointers WP01, WP02, WP03, WP04, and WP05 are respectively allocated. In the embodiment, it is described that five sub-buffers constitute a storage size capable of programming consecutive pieces of data. However, this storage size is a mere example to describe the embodiment, and thus a storage size may be changed depending on a memory system. Because sub-buffers of the 1_2 temporary buffer TB1_2 are not filled up with commands, when the first, second, third, fourth, and seventh commands CMD01, CMD02, CMD03, CMD04, and CMD07 to which the first, second, third, fourth, and fifth write pointers WP01, WP02, WP03, WP04, and WP05 are respectively allocated are output from the 1_1 temporary buffer TB1_1, the fifth and sixth commands CMD05 and CMD06 to which the eighth and ninth write pointers WP08 and WP09 are respectively allocated might not be output from the 1_2 temporary buffer TB1_2.

Figure 13B:
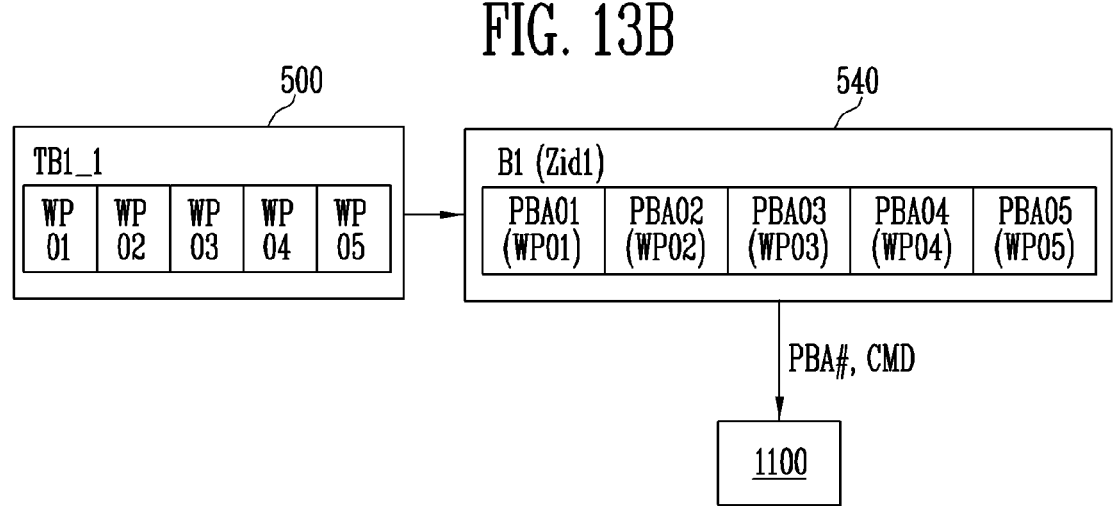

Referring to FIG. 13B, the commands CMD for the first zone ID Zid1 that are output from the zone manager 500 may be transferred to the memory interface 540. The memory interface 540 may store the first to fifth physical block addresses PBA01 to PBA05 mapped to the first to fifth write pointers WP01 to WP05, respectively, in the first output buffer B1 corresponding to the first zone id Zid1 and may transfer the first to fifth physical block addresses PBA01 to PBA05 and the commands CMD to the storage device 1100. The storage device 1100 may perform a program operation in dies corresponding to a zone ID according to the physical block addresses PBA #and the commands CMD.

Figure 14:
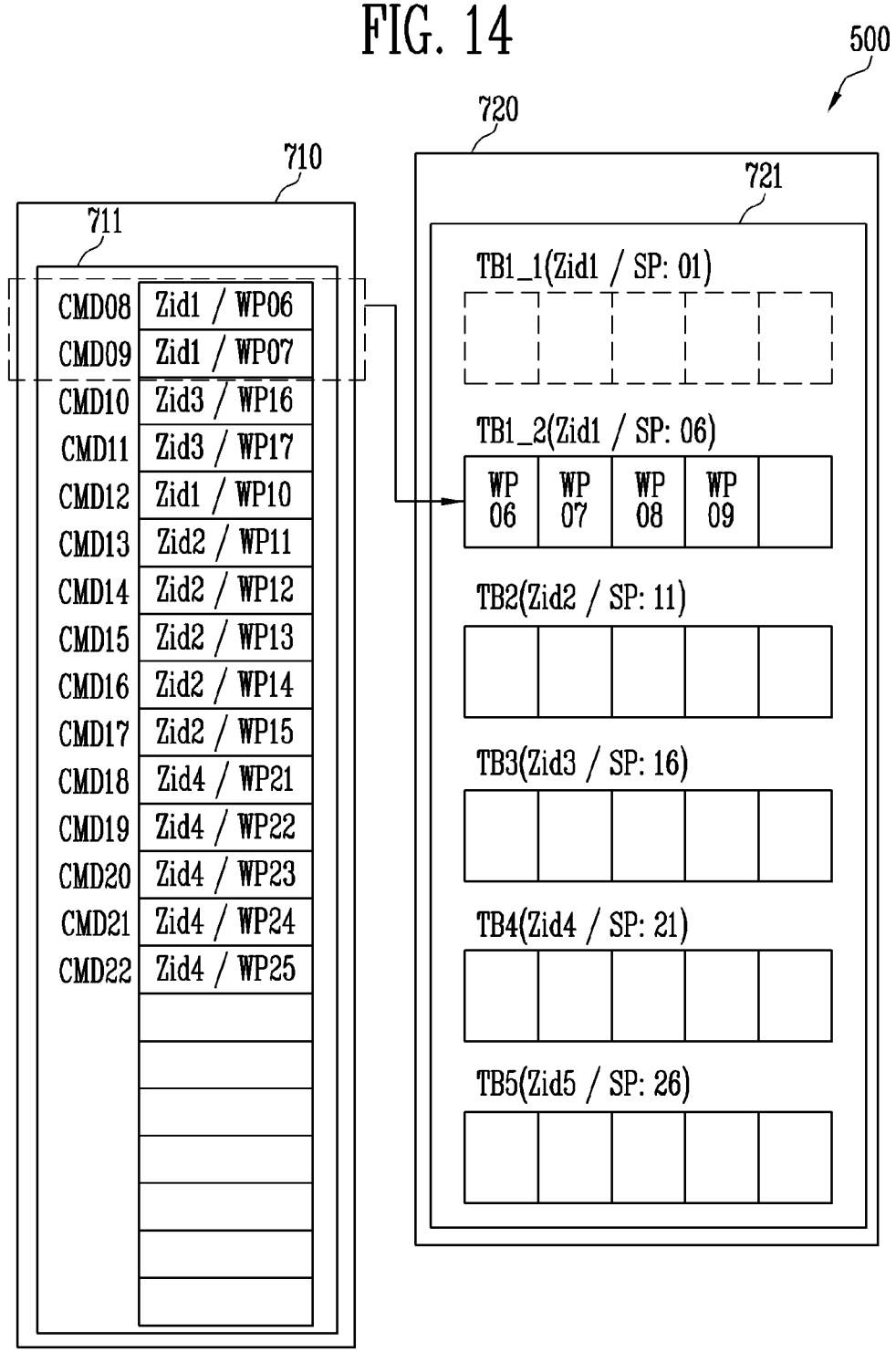

Referring to FIG. 14, because the first, second, third, fourth, and seventh commands CMD01, CMD02, CMD03, CMD04, and CMD07 stored in the 1_1 temporary buffer TB1_1 are output (please refer to FIG. 13A), the 1_1 temporary buffer TB1_1 may empty out. Because the first zone ID Zid1 and the sixth write pointer WP06 are allocated to the eighth command CMD08 input next to the seventh command CMD07, the queue controller 720 may input the eighth command CMD08 to which the sixth write pointer WP06 is allocated to the first sub-buffer of the 1_2 temporary buffer TB1_2 of which start pointer SP is 06. Because the first zone ID Zid1 and the seventh write pointer WP07 are allocated to the ninth command CMD09 input next to the eighth command CMD08, the ninth command CMD09 to which the seventh write pointer WP07 is allocated may be input to the second sub-buffer of the 1_2 temporary buffer TB1_2.

Figure 15:
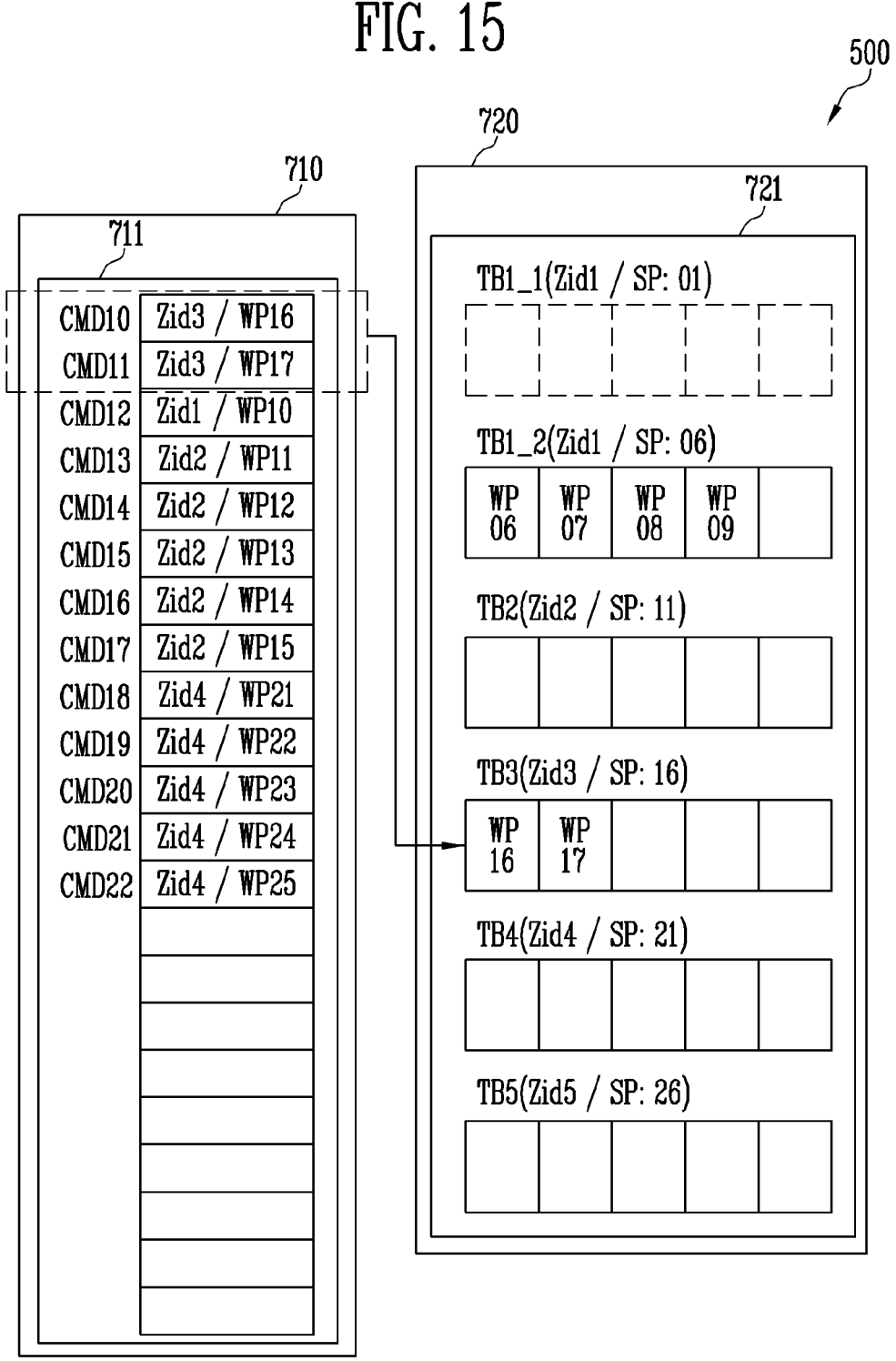

Referring to FIG. 15, because the third zone ID Zid3 and the sixteenth write pointer WP16 are allocated to the tenth command CMD10 input next to the ninth command CMD09, the queue controller 720 may input the tenth command CMD10 to which the sixteenth write pointer WP16 is allocated to the first sub-buffer of the third temporary buffer TB3 of which start pointer SP is 16. Because the seventeenth write pointer WP17 of the third zone ID Zid3 is queued next to the sixteenth write pointer WP16, the eleventh command CMD11 to which the seventeenth write pointer WP17 is allocated may be input to the second sub-buffer of the third temporary buffer TB3.

Figure 16A:
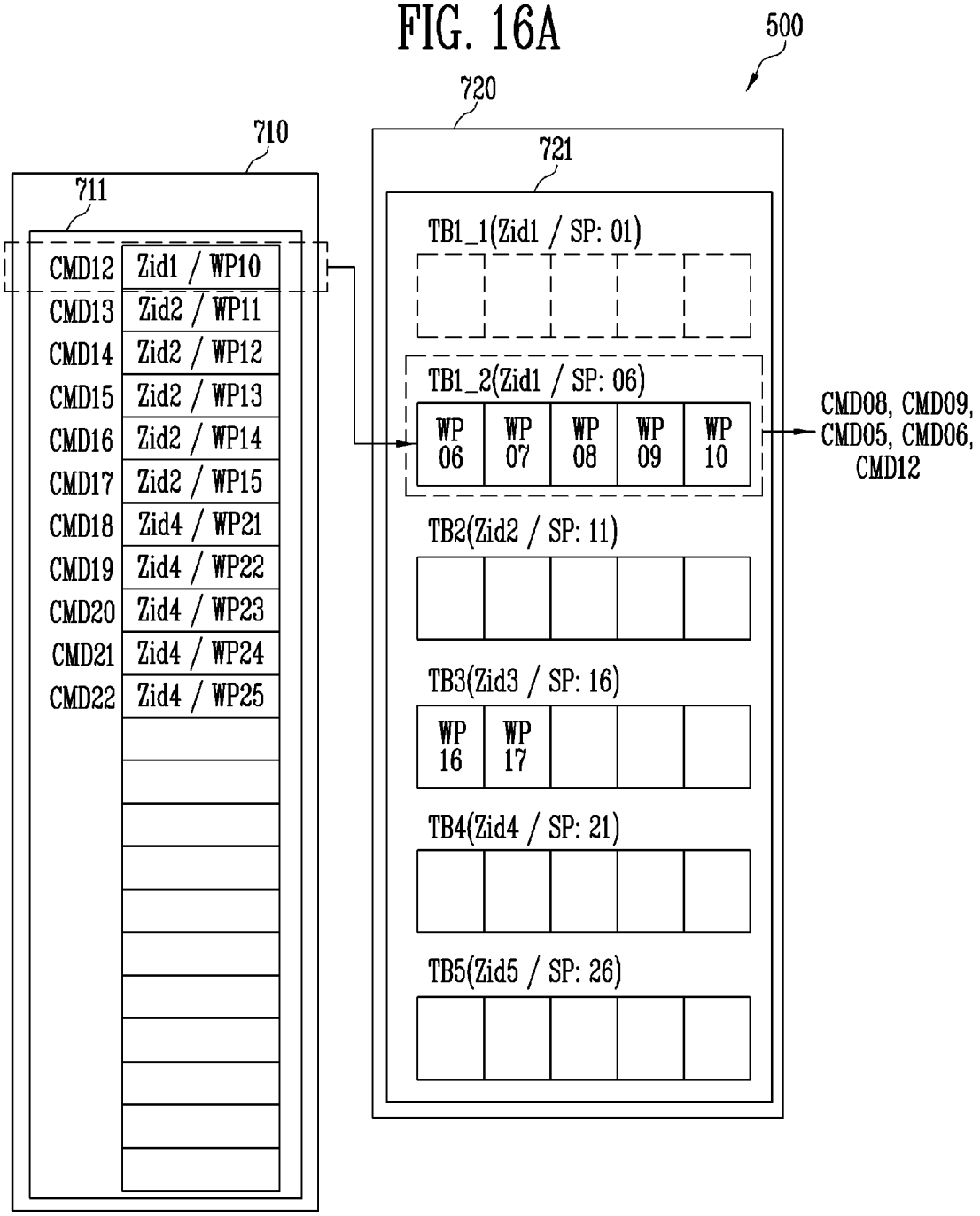

Referring to FIG. 16A, because the tenth write pointer WP10 of the first zone ID Zid1 is allocated to the twelfth command CMD12 input next to the eleventh command CMD11, the queue controller 720 may input the twelfth command CMD12 to which the tenth write pointer WP10 is allocated to the fifth sub-buffer of the 1_2 temporary buffer TB1_2. Accordingly, all sub-buffers of the 1_2 temporary buffer TB1_2 may be respectively filled with the eighth, ninth, fifth, sixth, and twelfth commands CMD08, CMD09, CMD05, CMD06, and CMD12 to which the sixth, seventh, eighth, ninth, and tenth write pointers WP06, WP07, WP08, WP09, and WP10 are respectively allocated. Because all the five sub-buffers which constitute a storage size capable of programming consecutive pieces of data are filled up, the queue controller 720 may output the eighth, ninth, fifth, sixth, and twelfth commands CMD08, CMD09, CMD05, CMD06, and CMD12 to which the sixth, seventh, eighth, ninth, and tenth write pointers WP06, WP07, WP08, WP09, and WP10 of the first zone ID Zid1 are respectively allocated.

Figure 16B:
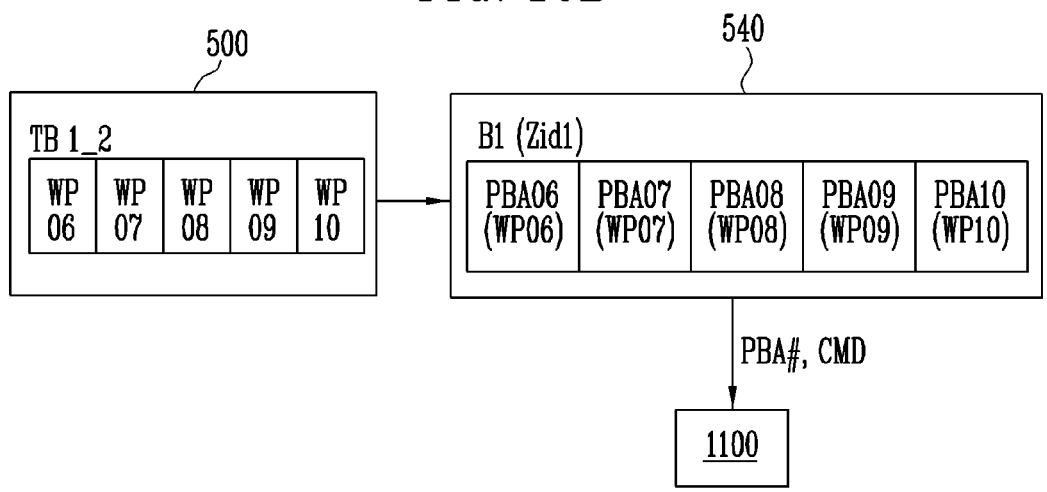

Referring to FIG. 16B, the eighth, ninth, fifth, sixth, and twelfth commands CMD08, CMD09, CMD05, CMD06, and CMD12 for the first zone ID Zid1 output from the zone manager 500 may be transferred to the memory interface 540. The memory interface 540 may store the sixth, seventh, eighth, ninth, and tenth physical block addresses PBA06, PBA07, PBA08, PBA09, and PBA10 respectively mapped to the sixth, seventh, eighth, ninth, and tenth write pointers WP06, WP07, WP08, WP09, and WP10 that are respectively allocated to the eighth, ninth, fifth, sixth, and twelfth commands CMD08, CMD09, CMD05, CMD06, and CMD12 in the first output buffer B1 corresponding to the first zone ID Zid1. The storage device 1100 may perform a program operation in dies corresponding to a zone ID according to the physical block addresses PBA #and the eighth, ninth, fifth, sixth, and twelfth commands CMD08, CMD09, CMD05, CMD06, and CMD12.

Figure 16C:
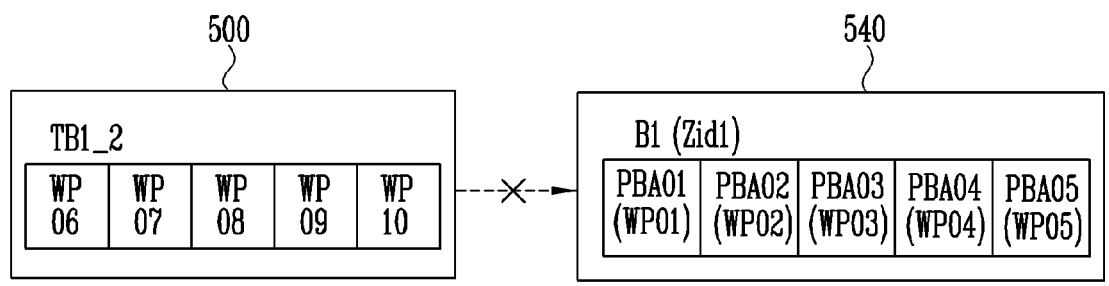

Referring to FIG. 16C, when all sub-buffers of the 1_2 temporary buffer TB1_2 are filled up with the eighth, ninth, fifth, sixth, and twelfth commands CMD08, CMD09, CMD05, CMD06, and CMD12 to which the sixth, seventh, eighth, ninth, and tenth write pointers WP06, WP07, WP08, WP09, and WP10 are respectively allocated, but the first output buffer B1 of the memory interface 540 does not empty, the zone manager 500 may delay output of the eighth, ninth, fifth, sixth, and twelfth commands CMD08, CMD09, CMD05, CMD06, and CMD12. For example, when the first to fifth physical block addresses PBA01 to PBA05 corresponding to the previous commands are stored in the first output buffer B1 of the memory interface 540, the zone manager 500 may delay output of the eighth, ninth, fifth, sixth, and twelfth commands CMD08, CMD09, CMD05, CMD06, and CMD12 to which the sixth, seventh, eighth, ninth, and tenth write pointers WP06, WP07, WP08, WP09, and WP10 are respectively allocated until the first output buffer B1 is reset. When the first output buffer B1 is reset, the zone manager 500 may output the eighth, ninth, fifth, sixth, and twelfth commands CMD08, CMD09, CMD05, CMD06, and CMD12 to which the sixth, seventh, eighth, ninth, and tenth write pointers WP06, WP07, WP08, WP09, and WP10 are respectively allocated as described above with reference to FIG. 16B.

Figure 17A:
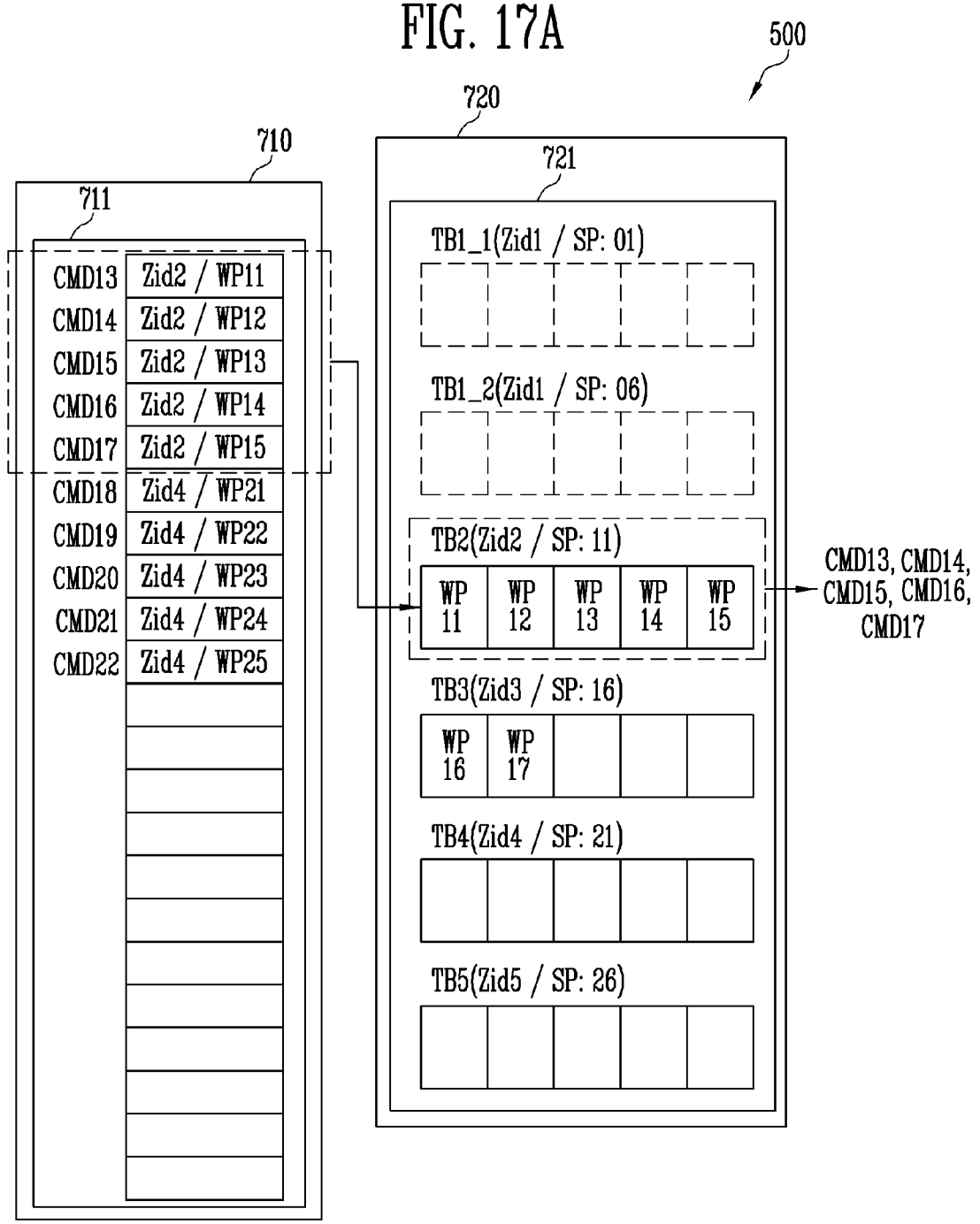

Referring to FIG. 17A, because the eighth, ninth, fifth, sixth, and twelfth commands CMD08, CMD09, CMD05, CMD06, and CMD12 stored in the 1_2 temporary buffer TB1_2 are output (please refer to FIG. 16A), the 1_2 temporary buffer TB1_2 may empty out. Because the second zone ID Zid2 is allocated and the eleventh, twelfth, thirteenth, fourteenth, and fifteenth write pointers WP11, WP12, WP13, WP14, and WP15 are respectively allocated to the thirteenth, fourteenth, fifteenth, sixteenth, and seventeenth commands CMD13, CMD14, CMD15, CMD16, and CMD17 input next to the twelfth command CMD12, the queue controller 720 may sequentially input the thirteenth, fourteenth, fifteenth, sixteenth, and seventeenth commands CMD13, CMD14, CMD15, CMD16, and CMD17 to which the eleventh, twelfth, thirteenth, fourteenth, and fifteenth write pointers WP11, WP12, WP13, WP14, and WP15 are respectively allocated to sub-buffers of the second temporary buffer TB2 of which start pointer SP is 11. Accordingly, all sub-buffers of the second temporary buffer TB2 may be filled with the thirteenth, fourteenth, fifteenth, sixteenth, and seventeenth commands CMD13, CMD14, CMD15, CMD16, and CMD17, to which the eleventh, twelfth, thirteenth, fourteenth, and fifteenth write pointers WP11, WP12, WP13, WP14, and WP15 are respectively allocated, in a one-to-one manner. Because all the five sub-buffers which constitute a storage size capable of programming consecutive pieces of data are filled up, the queue controller 720 may output the thirteenth, fourteenth, fifteenth, sixteenth, and seventeenth commands CMD13, CMD14, CMD15, CMD16, and CMD17 to which the eleventh, twelfth, thirteenth, fourteenth, and fifteenth write pointers WP11, WP12, WP13, WP14, and WP15 of the second zone ID Zid2 are respectively allocated.

Figure 17B:
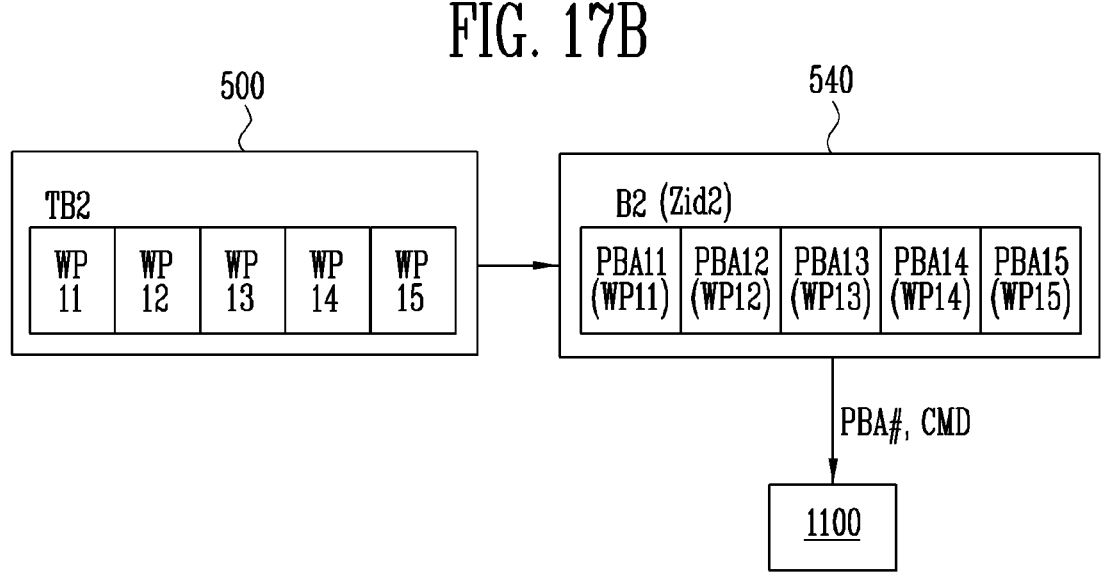

Referring to FIG. 17B, the thirteenth, fourteenth, fifteenth, sixteenth, and seventeenth commands CMD13, CMD14, CMD15, CMD16, and CMD17, to which the second zone ID Zid2 is allocated and the eleventh, twelfth, thirteenth, fourteenth, and fifteenth write pointers WP11, WP12, WP13, WP14, and WP15 are respectively allocated and which are output from the zone manager 500, may be transferred to the memory interface 540. The memory interface 540 may store the eleventh, twelfth, thirteenth, fourteenth, and fifteenth physical block addresses PBA11, PBA12, PBA13, PBA14, and PBA15 respectively mapped to the eleventh, twelfth, thirteenth, fourteenth, and fifteenth write pointers WP11, WP12, WP13, WP14, and WP15 in the second output buffer B2 corresponding to the second zone ID Zid2 and may transfer the thirteenth, fourteenth, fifteenth, sixteenth, and seventeenth commands CMD13, CMD14, CMD15, CMD16, and CMD17 to the storage device 1100 according to the eleventh, twelfth, thirteenth, fourteenth, and fifteenth physical block addresses PBA11, PBA12, PBA13, PBA14, and PBA15. The storage device 1100 may perform a program operation in dies corresponding to a zone ID according to the physical block addresses PBA #and the thirteenth, fourteenth, fifteenth, sixteenth, and seventeenth commands CMD13, CMD14, CMD15, CMD16, and CMD17.

Figure 18A:
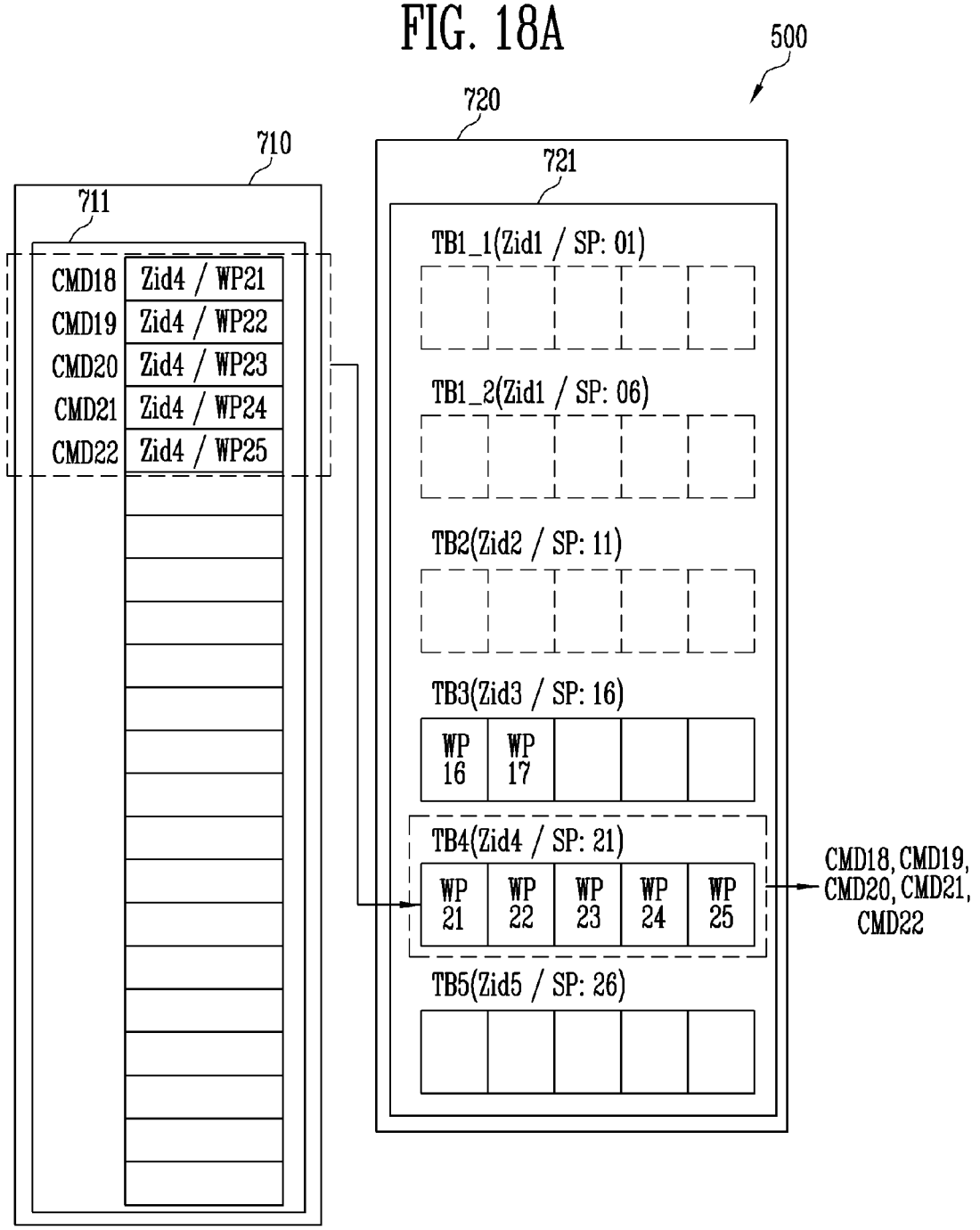

Referring to FIG. 18A, because the twenty-first, twenty-second, twenty-third, twenty-fourth, and twenty-fifth write pointers WP21, WP22, WP23, WP24, and WP25 are respectively allocated and the fourth zone ID Zid4 is allocated to the eighteenth, nineteenth, twentieth, twenty-first, and twenty-second commands CMD18, CMD19, CMD20, CMD21, and CMD22 input next to the seventeenth command CMD17, the queue controller 720 may sequentially input the eighteenth, nineteenth, twentieth, twenty-first, and twenty-second commands CMD18, CMD19, CMD20, CMD21, and CMD22, to which the twenty-first, twenty-second, twenty-third, twenty-fourth, and twenty-fifth write pointers WP21, WP22, WP23, WP24, and WP25 are respectively allocated, to sub-buffers of the fourth temporary buffer TB4 of which start pointer SP is 21. Accordingly, all sub-buffers of the fourth temporary buffer TB4 may be respectively filled with the eighteenth, nineteenth, twentieth, twenty-first, and twenty-second commands CMD18, CMD19, CMD20, CMD21, and CMD22 to which the twenty-first, twenty-second, twenty-third, twenty-fourth, and twenty-fifth write pointers WP21, WP22, WP23, WP24, and WP25 are respectively allocated. Because all the five sub-buffers which constitute a storage size capable of programming consecutive pieces of data are filled up, the queue controller 720 may give priority to the fourth zone ID Zid4 over the third zone ID Zid3 and output the eighteenth, nineteenth, twentieth, twenty-first, and twenty-second commands CMD18, CMD19, CMD20, CMD21, and CMD22 to which the fourth zone ID Zid4 having the higher priority is allocated.

Figure 18B:
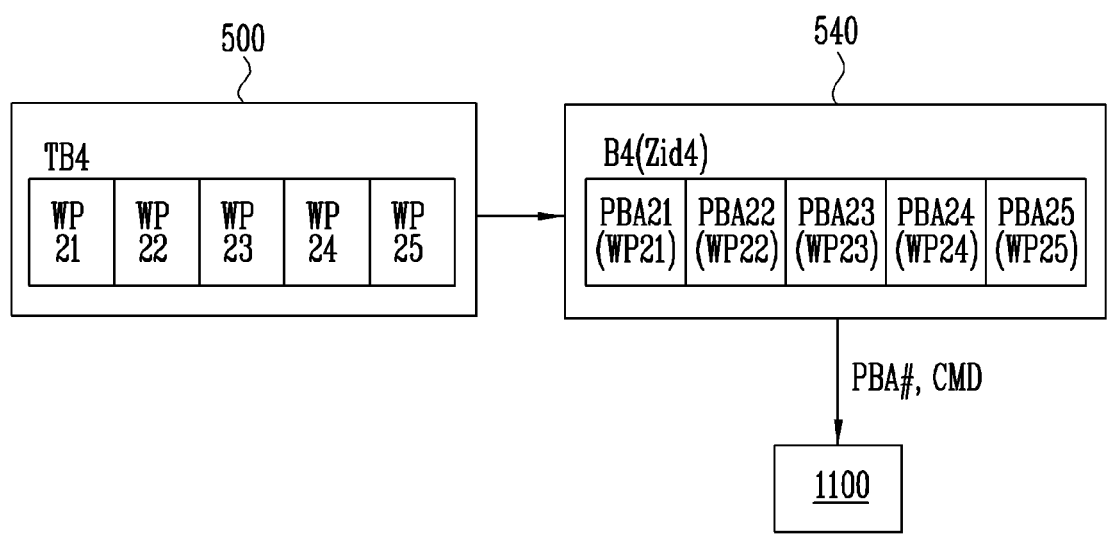

Referring to FIG. 18B, the eighteenth, nineteenth, twentieth, twenty-first, and twenty-second commands CMD18, CMD19, CMD20, CMD21, and CMD22, to which the fourth zone ID Zid4 is allocated and the twenty-first, twenty-second, twenty-third, twenty-fourth, and twenty-fifth write pointers WP21, WP22, WP23, WP24, and WP25 are respectively allocated and which are output from the zone manager 500, may be transferred to the memory interface 540. The memory interface 540 may store the twenty-first, twenty-second, twenty-third, twenty-fourth, and twenty-fifth physical block addresses PBA21, PBA22, PBA23, PBA24, and PBA25 respectively mapped to the twenty-first, twenty-second, twenty-third, twenty-fourth, and twenty-fifth write pointers WP21, WP22, WP23, WP24, and WP25 in the fourth output buffer B4 corresponding to the fourth zone ID Zid4 and may transfer the eighteenth, nineteenth, twentieth, twenty-first, and twenty-second commands CMD18, CMD19, CMD20, CMD21, and CMD22 to the storage device 1100 according to the twenty-first, twenty-second, twenty-third, twenty-fourth, and twenty-fifth physical block addresses PBA21, PBA22, PBA23, PBA24, and PBA25.

The storage device 1100 may perform a program operation in dies corresponding to a zone ID according to the physical block addresses PBA #and the commands CMD.

Figure 19A:
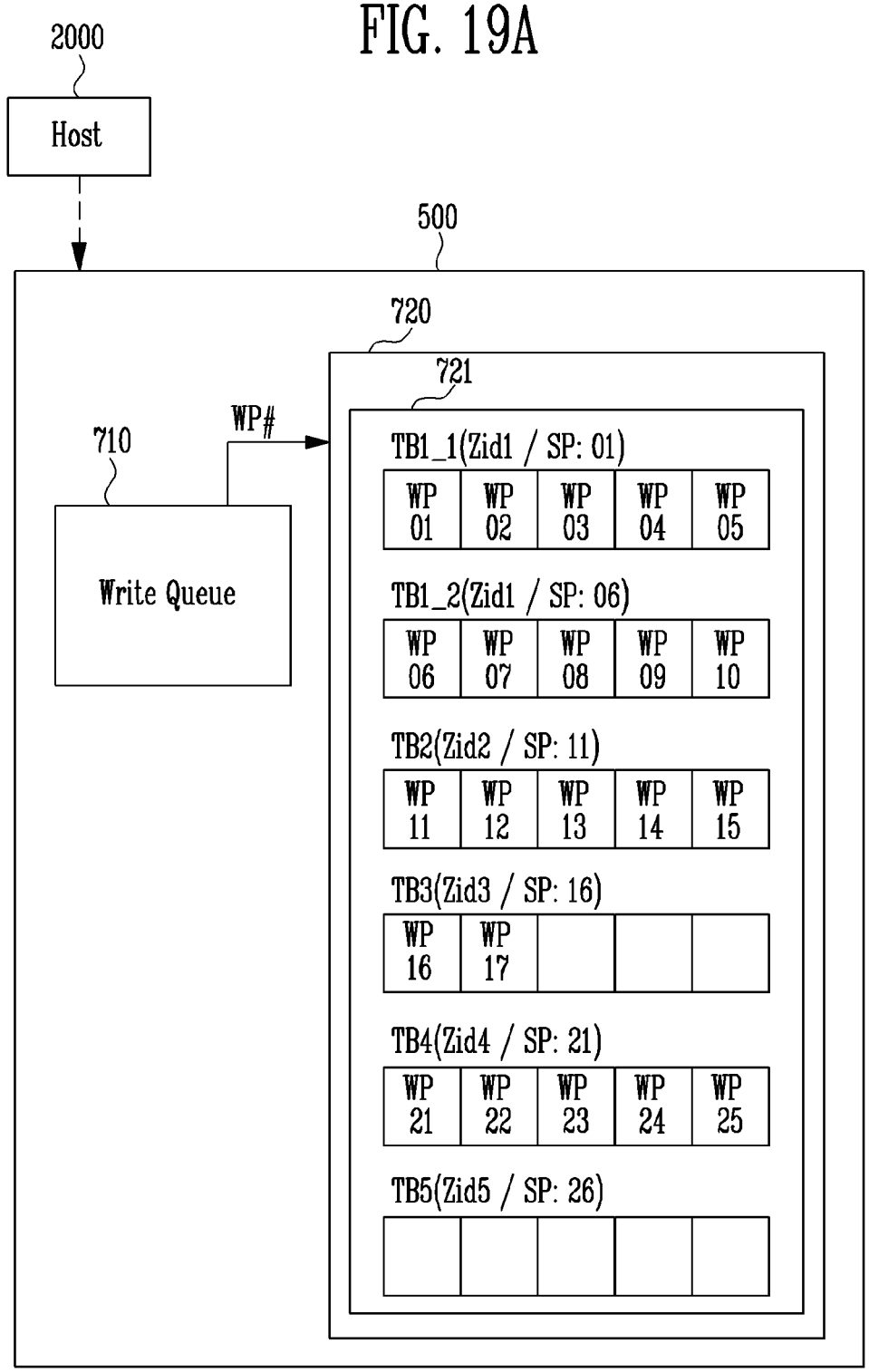

FIGS. 19A and 19B are diagrams illustrating operations of a memory system according to a second embodiment of the disclosed technology.

Referring to FIG. 19A, even when a temporary buffer filled up with commands occurs, the zone manager 500 might not output but have the write pointers WP #wait until an output request is received from the host 2000. For example, when the 1_1, 1_2, second, and fourth temporary buffers TB1_1, TB1_2, TB2, and TB4 are filled up with commands, the zone manager 500 may check whether the output request is received from the host 2000. When no output request has been received, the zone manager 500 may hold output of the commands.

Referring to FIG. 19B, when the host 2000 outputs an output request RQ_out, the zone manager 500 may output the commands CMD stored in the 1_1, 1_2, second, and fourth temporary buffers TB1_1, TB1_2, TB2, and TB4 in response to the output request RQ_out.

Figure 20A:
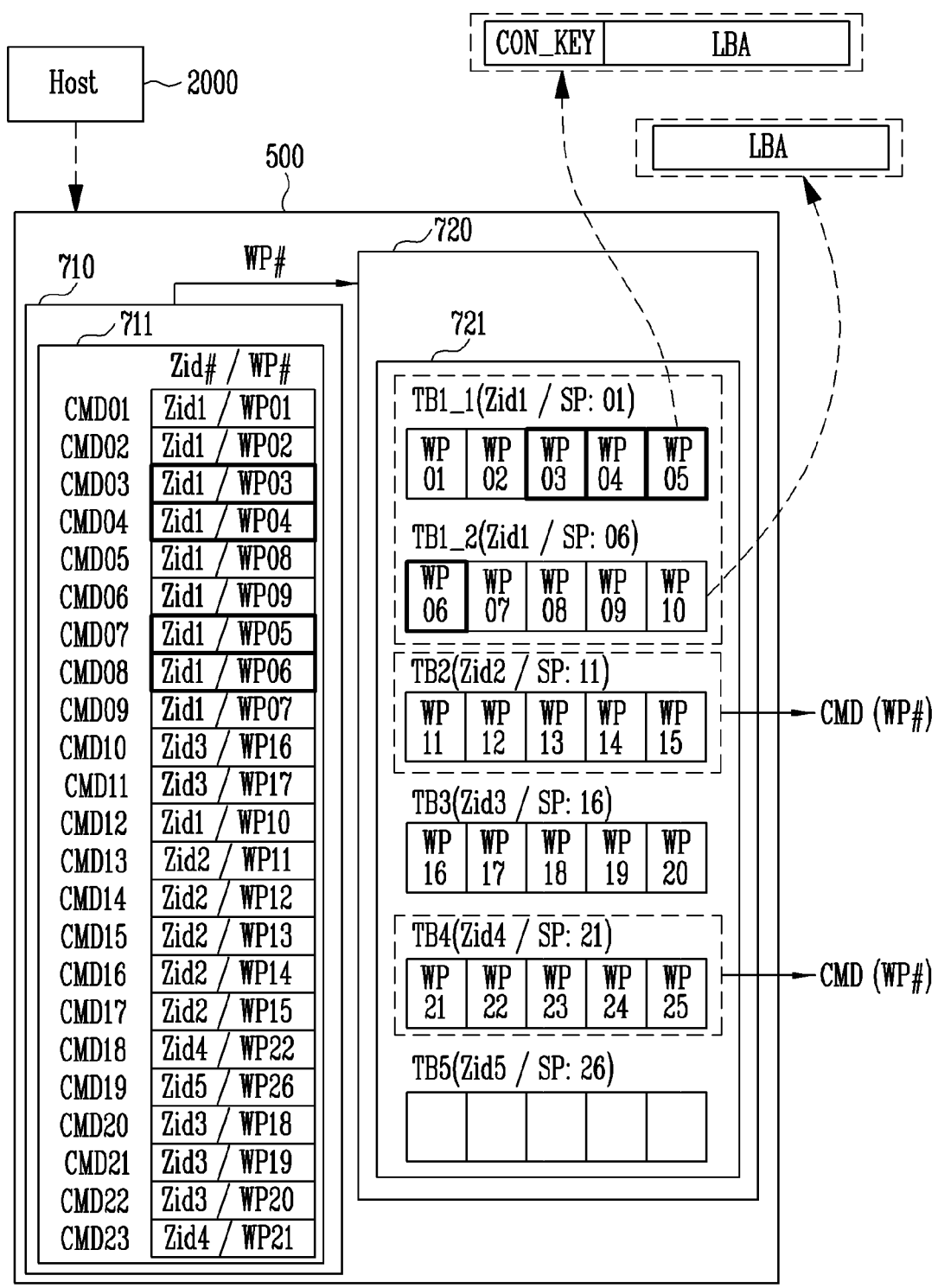
FIGS. 20A and 20B are diagrams illustrating operations of a memory system based on a third embodiment of the disclosed technology.
Figure 20B:
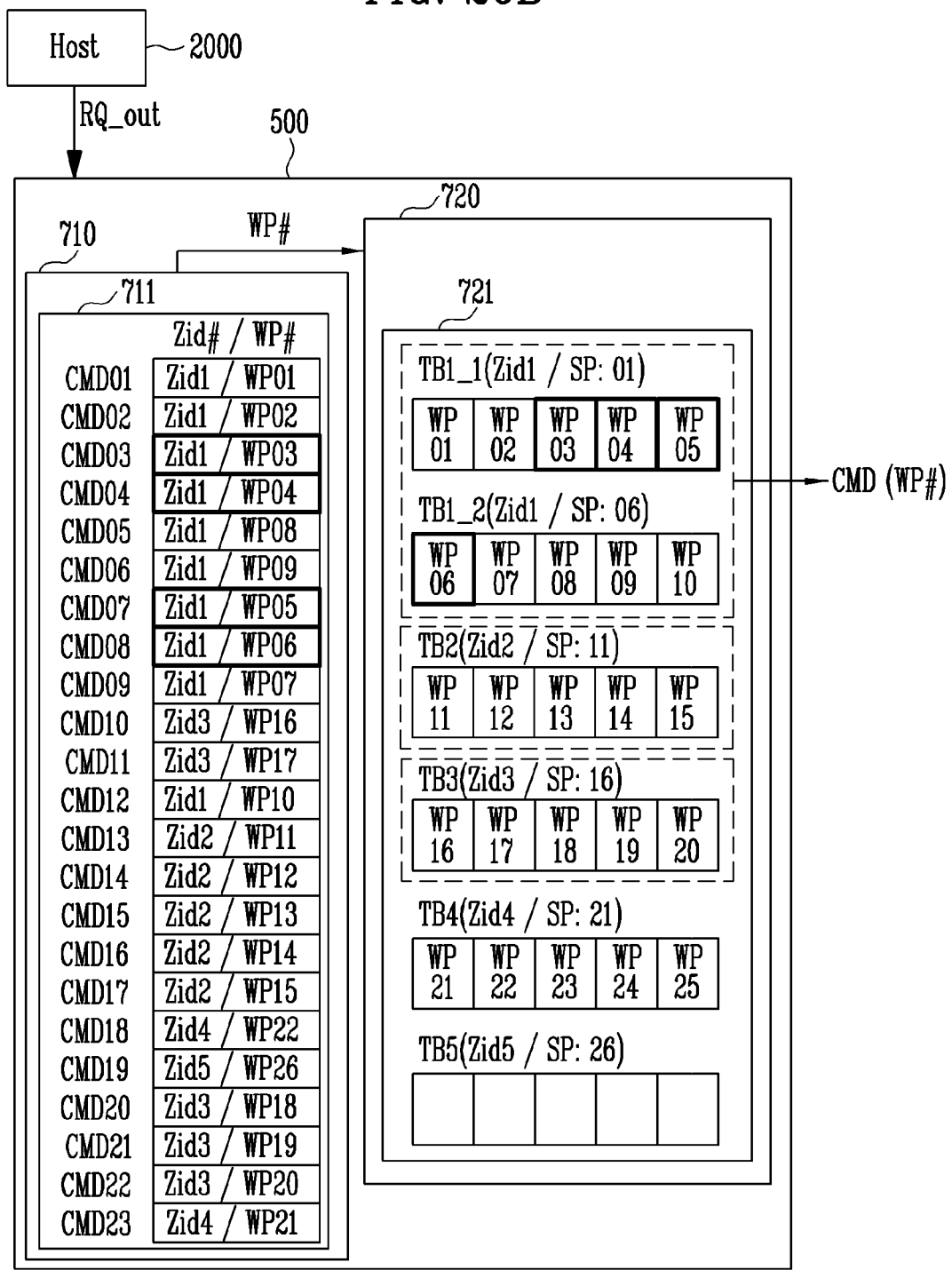

FIGS. 20A and 20B are diagrams illustrating operations of a memory system according to a third embodiment of the disclosed technology.

Referring to FIG. 20A, each of some of write pointers may include a control key CON_KEY. The control key CON_KEY may be an index designating a write pointer which can be output only according to an output request of the host 2000. The control key CON_KEY may be designated by the host 2000 or by the command manager 520 of FIG. 5 included in a controller. Accordingly, normal write pointers may include the logical block address LBA only, and write pointers selected by the host 2000 or the command manager 520 may include the control key CON_KEY and the logical block address LBA.

When a temporary buffer filled up with commands occurs, the zone manager 500 may immediately output the commands included in the corresponding temporary buffer, but in a temporary buffer including write pointers to which the control key CON_KEY is set, the zone manager 500 may hold output of the commands until an output request is received from the host 2000. For example, when each of the 1_1, 1_2, second, and fourth temporary buffers TB1_1, TB1_2, TB2, and TB4 is filled up with commands, the zone manager 500 may check whether a command, to which a write pointer to which the control key CON_KEY is set is allocated, exists among the commands stored in the 1_1, 1_2, second, and fourth temporary buffers TB1_1, TB1_2, TB2, and TB4. When it is determined that only commands to which normal write pointers are allocated are stored in the second and fourth temporary buffers TB2 and TB4, the zone manager 500 may immediately output the commands CMD stored in the second and fourth temporary buffers TB2 and TB4. When it is determined that commands to which the write pointers WP03 to WP06 to which the control key CON_KEY is set are allocated exist among commands to which the write pointers WP01 to WP10 are allocated and which are stored in the 1_1 and 1_2 temporary buffers TB1_1 and TB1_2, the zone manager 500 may check whether an output request is received from the host 2000. When no output request has been received, the zone manager 500 may hold output of the commands CMD which are stored in the 1_1 and 1_2 temporary buffers TB1_1 and TB1_2 and to which the write pointers WP01 to WP10 are allocated.

Referring to FIG. 20B, when the host 2000 outputs the output request RQ_out, the zone manager 500 may output the commands CMD stored in the 1_1 and 1_2 temporary buffers TB1_1 and TB1_2 in response to the output request RQ_out.

Figure 21:
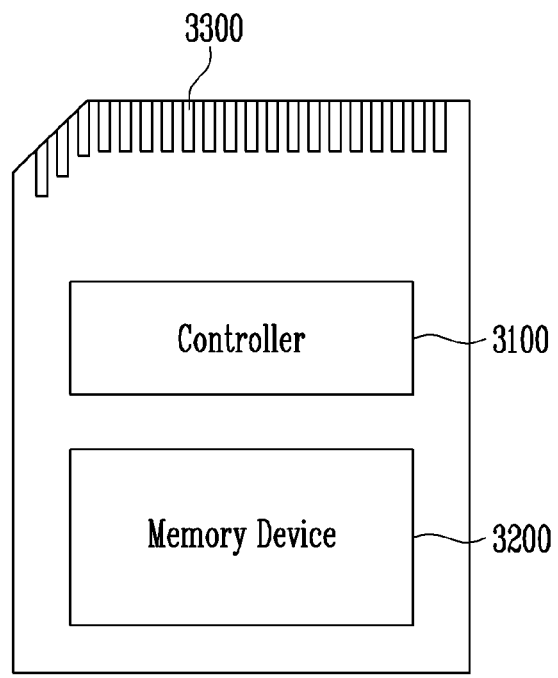
FIG. 21 is a diagram illustrating a memory card system to which a controller is applied based on an embodiment of the disclosed technology.

FIG. 21 is a diagram illustrating a memory card system 3000 to which a controller 3100 is applied according to an embodiment of the disclosed technology.

Referring to FIG. 21, the memory card system 3000 may include the controller 3100, a memory device 3200, and a connector 3300.

The controller 3100 may be coupled to the memory device 3200. The controller 3100 may be configured to access the memory device 3200. For example, the controller 3100 may be configured to control a program, read, or erase operation or a background operation of the memory device 3200. The controller 3100 may be configured in the same manner as the controller 1200 shown in FIG. 5. The controller 3100 may be configured to provide an interface between the memory device 3200 and a host. The controller 3100 may be configured to run firmware for controlling the memory device 3200.

In an embodiment, the controller 3100 may include components such as Random Access Memory (RAM), a processing unit, a host interface, a memory interface, and an Error Correction Code block.

The controller 3100 may communicate with an external device through the connector 3300. The controller 3100 may communicate with an external device (e.g., a host) based on a specific communication protocol. In an embodiment, the controller 3100 may be configured to communicate with the external device through at least one of various communication protocols such as Universal Serial Bus (USB), multimedia card (MMC), embedded MMC (eMMC), peripheral component interconnection (PCI), PCI-Express (PCI-E), Advanced Technology Attachment (ATA), Serial-ATA (SATA), Parallel-ATA (PATA), Small Computer System Interface (SCSI), Enhanced Small Disk Interface (ESDI), Integrated Drive Electronics (IDE), Firewire, Universal Flash Storage (UFS), WiFi, Bluetooth, and nonvolatile memory express (NVMe) protocols. In an embodiment, the connector 3300 may be defined by at least one of the above-described various communication protocols.

In an embodiment, the memory device 3200 may include various non-volatile memory elements such as Electrically Erasable and Programmable ROM (EEPROM), NAND flash memory, NOR flash memory, Phase-change RAM (PRAM), Resistive RAM (ReRAM), Ferroelectric RAM (FRAM), and Spin-Transfer Torque-Magnetic RAM (STT-MRAM).

The controller 3100 and the memory device 3200 may be integrated into a single semiconductor device to configure a memory card. For example, the controller 3100 and the memory device 3200 may be integrated into a single semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro or eMMC), an SD card (SD, miniSD, microSD, or SDHC), or Universal Flash Storage (UFS).

Figure 22:
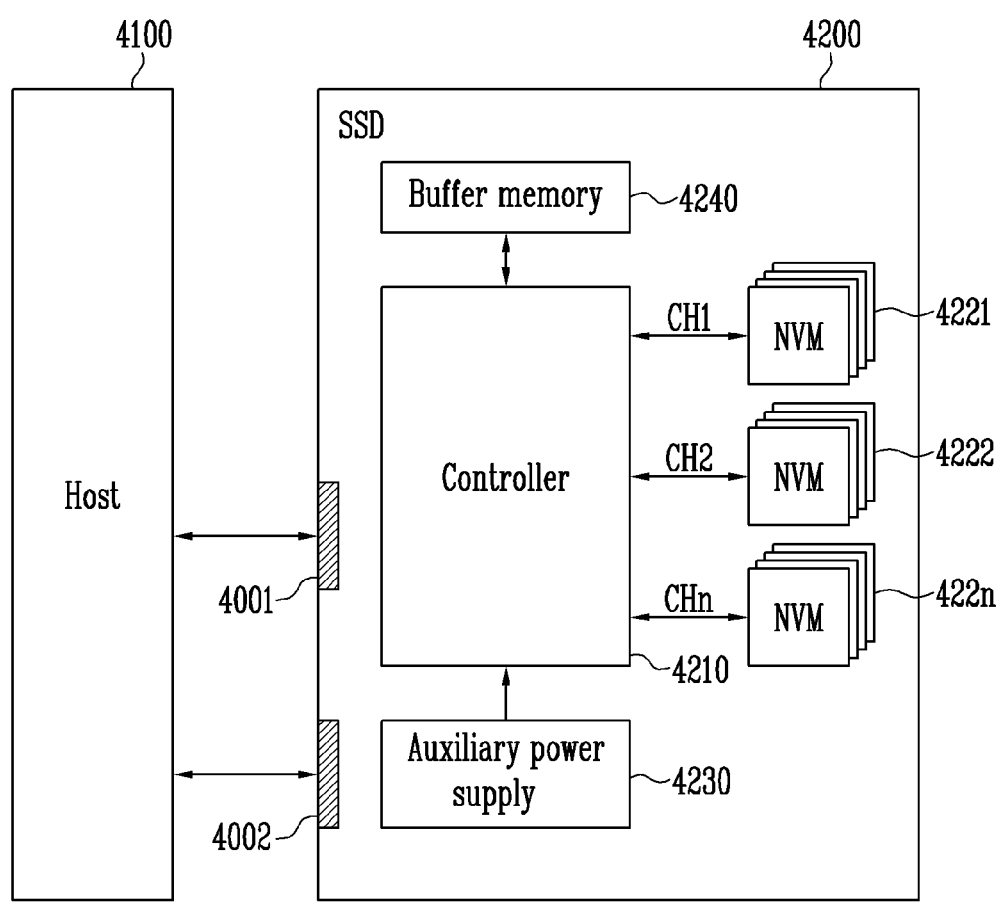
FIG. 22 is a diagram illustrating a solid state drive (SSD) system to which a controller is applied based on an embodiment of the disclosed technology.

FIG. 22 is a diagram illustrating a Solid State Drive (SSD) system 4000 to which a controller 4210 is applied according to an embodiment of the disclosed technology.

Referring to FIG. 22, the SSD system 4000 may include a host 4100 and an SSD 4200. The SSD 4200 may exchange signals with the host 4100 through a signal connector 4001 and may receive power through a power connector 4002. The SSD 4200 may include the controller 4210, a plurality of flash memory 4221 to 422*n*, an auxiliary power supply 4230, and buffer memory 4240.

According to an embodiment of the disclosed technology, the controller 4210 may perform the function of the controller 1200 described above with reference to FIG. 5.

The controller 4210 may control the plurality of flash memory 4221 to 422*n* in response to the signals received from the host 4100. In an embodiment, the signals may be based on interfaces of the host 4100 and the SSD 4200. For example, the signals may be defined by at least one of various interfaces such as a Universal Serial Bus (USB), a multimedia card (MMC), an embedded MMC (eMMC), a peripheral component interconnection (PCI), PCI-Express (PCI-E), Advanced Technology Attachment (ATA), Serial-ATA (SATA), Parallel-ATA (PATA), a Small Computer System Interface (SCSI), an Enhanced Small Disk Interface (ESDI), Integrated Drive Electronics (IDE), Firewire, Universal Flash Storage (UFS), WiFi, Bluetooth, and nonvolatile memory express (NVMe).

The auxiliary power supply 4230 may be coupled to the host 4100 through the power connector 4002. The auxiliary power supply 4230 may be supplied with a power voltage from the host 4100 and may be charged. The auxiliary power supply 4230 may provide the power voltage of the SSD 4200 when power is not smoothly supplied from the host 4100. In an embodiment, the auxiliary power supply 4230 may be disposed within or external to the SSD 4200. For example, the auxiliary power supply 4230 may be disposed on a main board and may supply auxiliary power to the SSD 4200.

The buffer memory 4240 may function as buffer memory of the SSD 4200. For example, the buffer memory 4240 may temporarily store data received from the host 4100 or data received from the plurality of flash memory 4221 to 422*n*, or may temporarily store metadata (e.g., mapping tables) of the plurality of flash memory 4221 to 422*n*. The buffer memory 4240 may include volatile memory such as DRAM, SDRAM, DDR SDRAM, and LPDDR SDRAM or nonvolatile memory such as FRAM, ReRAM, STT-MRAM, and PRAM.

According to embodiments of the disclosed technology, a backlog of commands can be prevented or reduced by giving a priority to certain commands.

Only exemplary embodiments of the disclosed technology have been described in the drawings and specification. Various modifications and enhancements to the disclosed embodiments and other embodiments can be made based on what is described or/and illustrated in this patent document.

What is claimed is:

1. A memory system, comprising:
 a storage device including a plurality of memory blocks each grouped into one of a plurality of zones corresponding to a plurality of zone identification; and
 a controller including:
 a command manager configured to, based on requests and write pointers received from a host, generate commands allocated to the write pointers, and store the commands based on operating states of the storage device, each of the write pointers indicating an order that the requests are output from the host; and
 a zone manager configured to:
 in response to the commands being received from the command manager, store the commands in a write queue regardless of an order of the write pointers,
 select a command corresponding to a selected zone identification among the commands stored in the write queue,
 store the selected command in a selected buffer allocated to the selected zone identification such that an order of write pointers of commands stored in the selected buffer is consecutive, and
 output the commands stored in the selected buffer, based on a number of the commands stored in the selected buffer.

2. The memory system of claim 1, wherein the storage device is configured to, based on the commands being received from the controller, store data in at least one memory block corresponding to the selected zone identification of the commands.

3. The memory system of claim 1, wherein the controller comprises:
 a system buffer configured to store a mapping table including physical block addresses, logical block addresses, and the plurality of zone identifications; and
 a memory interface configured to store the commands output from the zone manager and physical block addresses associated with the commands, and transfer the physical block addresses and the commands to the storage device.

4. The memory system of claim 1, wherein the zone manager comprises:
 a write queue configured to store the commands output from the command manager in an order in which the commands are input to the write queue by allocating the plurality of zone identifications and the write pointers; and
 a queue controller configured to store the selected command in the selected buffer allocated to the selected zone identification of the selected command among buffers, according to the order of the write pointer of the selected command, and output commands stored in a buffer whose storage size is filled up among the buffers.

5. The memory system of claim 4, wherein each of the buffers includes sub-buffers to which the write pointers are respectively allocated, and
 wherein the selected command stored in a sub-buffer corresponding to the write pointer of the selected command.

6. The memory system of claim 5, wherein the controller is configured to:
 assign a priority to the commands that are stored in the buffer whose storage area is filled up, and
 output the commands stored in the buffer.

7. The memory system of claim 1, wherein the controller is configured to:
 output commands associated with write pointers including a control key in response to an output request from the host.

8. A controller, comprising:
 a command manager configured to generate commands based on requests received from a host, allocate write pointers to the commands in an order in which the commands are generated, and store the commands in order based on an operating state of a storage device, the storage device including memory zones, each memory zone having a corresponding zone identification;
 a write queue configured to, in response to the commands being received from the command manager, associate each of the commands with a corresponding zone identification and store the commands according to an order that the commands have received regardless of an order of the write pointers;

temporary buffers configured to store the commands based on the zone identifications associated with the commands; and a zone manager configured to:

in response to a command output from the write queue, store the command in a temporary buffer corresponding to a zone identification of the command among the temporary buffers such that an order of write pointers of commands stored in a selected buffer is consecutive, and output the commands stored in the temporary buffer when a storage size of the temporary buffer is filled up.

9. A controller for controlling a memory device, comprising:

a write queue configured to store a plurality of commands for operating the memory device that are generated based on a plurality of requests received from a host, a plurality of zone identifications of the plurality of commands each indicating a memory region in the memory device, and a plurality of write pointers of the plurality of commands each indicating an order that the plurality of requests are output from the host, wherein the plurality of commands are stored in the write queue regardless of an order of the plurality of write pointers; and a queue controller comprising a plurality of buffers allocated to one of the plurality of zone identifications, and the queue controller configured to:

receive the plurality of commands, the plurality of zone identifications, and the plurality of write pointers from the write queue, select a command corresponding to the one of the plurality of zone identifications among the plurality of commands, store the selected command in a selected buffer allocated to the one of plurality of zone identifications such that an order of write pointers of commands stored in the selected buffer is consecutive, and output the commands stored in the selected buffer based on a number of the commands stored in the selected buffer.

10. The controller of claim 9, wherein the plurality of zone identifications includes indices that are allocated to corresponding memory regions according to consecutive logical block addresses, and wherein each of the plurality of write pointers comprises a logical block address used to write consecutive data in the memory region.

11. The controller of claim 9, wherein the write queue includes a queue buffer configured to store the plurality of commands.

12. The controller of claim 9, wherein each of the plurality of buffers includes sub-buffers, and wherein each of the sub-buffers corresponds to one of the plurality of write pointers.

13. The controller of claim 12, wherein the selected command includes a first command, to which a write pointer designated as a start pointer is allocated, and wherein the first command is stored in a first sub-buffer among the sub-buffers included in the selected buffer.

14. The controller of claim 13, wherein the queue controller is configured to store the selected command in the sub-buffers according to an order of write pointers of the command.

15. The controller of claim 9, wherein each of the plurality of buffers includes sub-buffers, and wherein the queue controller is further configured to, hold output of at least one command stored in a buffer until corresponding commands are stored in sub-buffers included in the buffer.

16. The controller of claim 9, further comprising:

a system buffer configured to store mapping information of physical block addresses and logical block addresses and mapping information of the logical block addresses and zone identifications of memory regions included in the memory device.

17. The controller of claim 9, further comprising:

a memory interface including a plurality of output buffers corresponding to the plurality of zone identifications in an one-to-one manner.

18. The controller of claim 17, wherein the queue controller is further configured to output, to an output buffer allocated to the zone identification, the commands stored in sub-buffers included in a buffer allocated to a zone identification, after the output buffer becomes empty.

19. The controller of claim 9, further comprising:

a command manager configured to generate the plurality of commands based on a reception order that the plurality of requests are received from the host, determine a transmission order of the plurality of commands to be different from the reception order based on an operating state of the memory device, and transfer the plurality of commands to the write queue according to the transmission order, and wherein the command manager is configured to, in response to write pointers outputted from the queue controller, search for physical block addresses respectively mapped to the write pointers.

* * * * *